(12) United States Patent
Takai et al.

(10) Patent No.: US 11,815,883 B2
(45) Date of Patent: Nov. 14, 2023

(54) CONVEYANCE SYSTEM, CONVEYANCE METHOD, AND PROGRAM

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Tetsuya Taira, Nagakute (JP); Mikio Honda, Toyota (JP); Shiro Oda, Anjo (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 436 days.

(21) Appl. No.: 17/095,956

(22) Filed: Nov. 12, 2020

(65) Prior Publication Data
US 2021/0155410 A1  May 27, 2021

(30) Foreign Application Priority Data
Nov. 25, 2019 (JP) .................. 2019-212382

(51) Int. Cl.
*G05B 19/418* (2006.01)
*B65G 1/04* (2006.01)
(Continued)

(52) U.S. Cl.
CPC ..... *G05B 19/41895* (2013.01); *B65G 1/0492* (2013.01); *B65G 1/1375* (2013.01); *B66F 9/063* (2013.01); *G06T 7/0002* (2013.01)

(58) Field of Classification Search
CPC .... B62D 63/025; B62D 63/04; B65G 1/1375; B65G 1/0492; G06T 7/0002; G06V 20/10; G06V 20/56; G05B 19/41895; B66F 9/063
See application file for complete search history.

(56) References Cited

U.S. PATENT DOCUMENTS 9,026,301 B2 * 5/2015 Zini ..................... G06K 7/0008
901/1
9,073,736 B1 * 7/2015 Hussain .................. B66F 9/063
(Continued)

FOREIGN PATENT DOCUMENTS

JP 2008-127178 A 6/2008
JP 2014-213993 A 11/2014
(Continued)

*Primary Examiner* — Thomas Randazzo
(74) *Attorney, Agent, or Firm* — Oliff PLC

(57) ABSTRACT

A conveyance system includes a plurality of conveyance robots, a storage unit, a stability information acquisition unit, a selection unit, and a system controller, which serves as a controller. The plurality of conveyance robots convey a wagon that accommodates a conveyed object. The storage unit stores robot information regarding features that the plurality of respective conveyance robots include. The stability information acquisition unit acquires stability information regarding stability when the conveyed object is conveyed. The selection unit selects one of the plurality of conveyance robots based on the robot information and the stability information that have been acquired. The system controller instructs the one conveyance robot that has been selected to convey the conveyed object.

7 Claims, 21 Drawing Sheets

(51) Int. Cl.
  *B66F 9/06*   (2006.01)
  *G06T 7/00*   (2017.01)
  *B65G 1/137*  (2006.01)

(56) References Cited

U.S. PATENT DOCUMENTS

| | | | | |
|---|---|---|---|---|
| 9,527,710 | B1* | 12/2016 | Hussain | B66F 9/063 |
| 10,042,333 | B2* | 8/2018 | Erie | G05D 1/0066 |
| 10,046,910 | B2* | 8/2018 | Wagner | B65F 1/1468 |
| 10,466,692 | B2* | 11/2019 | Douglas | G05D 1/0225 |
| 10,471,972 | B1* | 11/2019 | Mackey | B61D 15/00 |
| 10,486,951 | B2* | 11/2019 | High | G05D 1/0291 |
| 10,793,369 | B2* | 10/2020 | Sekich | B65G 43/08 |
| 11,084,410 | B1* | 8/2021 | Bhaskaran | B66F 9/063 |
| 2016/0236867 | A1* | 8/2016 | Brazeau | B25J 5/007 |
| 2019/0062057 | A1* | 2/2019 | Cantor | G05D 1/0088 |
| 2019/0193721 | A1* | 6/2019 | Yamamuro | B60W 30/182 |
| 2019/0352158 | A1* | 11/2019 | Tani | B66F 9/063 |
| 2019/0354119 | A1* | 11/2019 | Coq | A47B 97/00 |
| 2019/0362160 | A1* | 11/2019 | Torikura | G01C 21/165 |
| 2021/0253375 | A1* | 8/2021 | Gondoh | B65G 47/917 |

FOREIGN PATENT DOCUMENTS

| | | | |
|---|---|---|---|
| JP | 2019-116251 | A | 7/2019 |
| JP | 2019-189438 | A | 10/2019 |

* cited by examiner

T10

| FEATURE ITEM | FIRST ROBOT | SECOND ROBOT |
|---|---|---|
| POSTURE CONTROL MECHANISM | YES | NO |
| SCORE (S) | $3 < S$ | $S \leqq 3$ |

| STABILITY INFORMATION ||| SCORE |
| ITEM | STATE OF CONVEYED OBJECT | STABILITY | |
|---|---|---|---|
| CLEARING TRAY | NO LEFTOVER FOOD | STABLE | 1 |
| | AMOUNT OF LEFTOVER FOOD: LESS THAN HALF | A LITTLE UNSTABLE | 3 |
| | AMOUNT OF LEFTOVER FOOD: HALF OR MORE | UNSTABLE | 5 |

| FEATURE ITEM | FIRST ROBOT | SECOND ROBOT |
|---|---|---|
| MEASUREMENT ACCELERATION | 0.45 | 0.31 |
| SCORE (S) | $S \leqq 3$ | $3 < S$ |

| REFERENCE IMAGE DATABASE ||
| REFERENCE IMAGE DATA | SCORE |
| --- | --- |
| 001 | 1 |
| 002 | 5 |
| 003 | 3 |
| 004 | 3 |
| 005 | 1 |
| ⋮ | ⋮ |

Fig. 20

CONVEYANCE SYSTEM, CONVEYANCE METHOD, AND PROGRAM

CROSS REFERENCE TO RELATED APPLICATIONS

This application is based upon and claims the benefit of priority from Japanese patent application No. 2019-212382, filed on Nov. 25, 2019, the disclosure of which is incorporated herein in its entirety by reference.

BACKGROUND

The present disclosure relates to a conveyance system, a conveyance method, and a program.

The development of autonomous moving apparatuses that autonomously move in certain buildings and facilities has been advancing. By equipping such an autonomous moving apparatus with a parcel carrier or towing a cart, it can be used as an automatic delivery apparatus that automatically delivers parcels. The automatic delivery apparatus can deliver, for example, a parcel loaded at a starting place to a destination by autonomously traveling from the starting point to the destination.

For example, an automatic delivery apparatus disclosed in U.S. Pat. No. 9,026,301 includes an autonomously movable tractor part and a parcel carrier part. Further, a computer provided in them stores electronic maps of floor plans of buildings and routes that the automatic delivery apparatus follows when it moves from one place to the next place. The above-described automatic delivery apparatus conveys various objects by using parcel carrier parts of different types depending on the purpose.

SUMMARY

When there are conveyance robots of a plurality of different types in a conveyance system in which a conveyance robot conveys a conveyed object, it is desired that the conveyance system select an appropriate conveyance robot in accordance with the state of the conveyance object.

The present disclosure has been made in order to solve the aforementioned problem and provides a conveyance system and the like capable of preferably conveying a conveyed object.

A conveyance system according to one aspect of the present disclosure includes a plurality of conveyance robots, a robot information storage unit, a stability information acquisition unit, a selection unit, and a controller. The plurality of conveyance robots convey a wagon that accommodates a conveyed object. The storage unit stores robot information regarding features that the plurality of respective conveyance robots include. The stability information acquisition unit acquires stability information regarding stability when the conveyed object is conveyed. The selection unit selects one of the plurality of conveyance robots based on the robot information and the stability information that have been acquired. The controller instructs the one conveyance robot that has been selected to convey the conveyed object.

The conveyance system selects the conveyance robot in accordance with the stability of the conveyed object. Thus, the conveyance system is able to efficiently convey the conveyance object.

In the aforementioned conveyance system, the stability information acquisition unit may accept an input from a user regarding the stability information, thereby acquiring stability information. Thus, the conveyance system is able to preferably acquire the stability information.

In the aforementioned conveyance system, the storage unit may store each of reference image data of the conveyed object and information regarding the stability that corresponds to the reference image data in advance, the stability information acquisition unit may acquire image data obtained by capturing images of the conveyed object as the stability information, and the selection unit may compare the image data of the conveyed object with the reference image data to determine the stability of the conveyed object. Thus, the conveyance system is able to acquire the stability information by capturing images of the conveyed object.

In the aforementioned conveyance system, the storage unit may store features of a raising/lowering mechanism for raising and/or lowering the wagon that each of the plurality of conveyance robots includes as the robot information, and the selection unit may select the one conveyance robot based on the features of the raising/lowering mechanism that each of the plurality of conveyance robots includes. Thus, the conveyance system is able to select a preferable conveyance robot in accordance with the features of the raising/lowering mechanism.

In the aforementioned conveyance system, the storage unit may store information regarding operation accelerations of the plurality of respective conveyance robots as the robot information, and the selection unit may select the one conveyance robot based on the information regarding the operation accelerations that the plurality of respective conveyance robots include. Thus, the conveyance system is able to select a preferable one of the plurality of conveyance robots whose operation accelerations are different from one another even when they have the same configuration.

A conveyance method according to one aspect of the present disclosure selects one of a plurality of conveyance robots configured to convey a wagon that accommodates a conveyed object and causes the one conveyance robot to convey a wagon. The aforementioned conveyance method includes a storing step, a stability information acquisition step, a selecting step, and a control step. The storing step stores robot information regarding features that the plurality of respective conveyance robots include. The stability information acquisition step acquires stability information regarding stability when the conveyed object is conveyed. The selecting step selects one of the plurality of conveyance robots based on the robot information and the stability information that have been acquired. The control step instructs the one conveyance robot that has been selected to convey the conveyed object.

The aforementioned conveyance method selects the conveyance robot in accordance with the stability of the conveyed object. Thus, the conveyance system is able to efficiently convey the conveyance object.

A program according to one aspect of the present disclosure causes a computer to execute a conveyance method for selecting one of a plurality of conveyance robots configured to convey a wagon that accommodates a conveyed object and causes the one conveyance robot to convey a wagon. The aforementioned conveyance method includes a storing step, a stability information acquisition step, a selecting step, and a control step. The storing step stores robot information regarding features that the plurality of respective conveyance robots include. The stability information acquisition step acquires stability information regarding stability when the conveyed object is conveyed. The selecting step selects one of the plurality of conveyance robots based on the robot information and the stability information that have been acquired. The control step instructs the one conveyance robot that has been selected to convey the conveyed object.

The aforementioned program selects the conveyance robot in accordance with the stability of the conveyed object. Thus, the conveyance system is able to efficiently convey the conveyance object.

According to the present disclosure, it is possible to provide a conveyance system and the like capable of preferably conveying a conveyance object.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 10 is a table showing an example of a database regarding features of the robot;

FIG. 11 is a table showing an example of a database regarding stability information;

FIG. 17 is a table showing an example of robot information according to a modified example of the first embodiment;

FIG. 20 is a table showing an example of a database of reference image data.

DESCRIPTION OF EMBODIMENTS

Hereinafter, the present disclosure will be explained through embodiments of the present disclosure. However, they are not intended to limit the scope of the present disclosure according to the claims. Further, all of the components/structures described in the embodiments are not necessarily indispensable as means for solving the problem. For clarifying the explanation, the following description and the drawings are partially omitted and simplified as appropriate. The same symbols are assigned to the same elements throughout the drawings and duplicated explanations are omitted as appropriate.

First Embodiment

Figure 1:
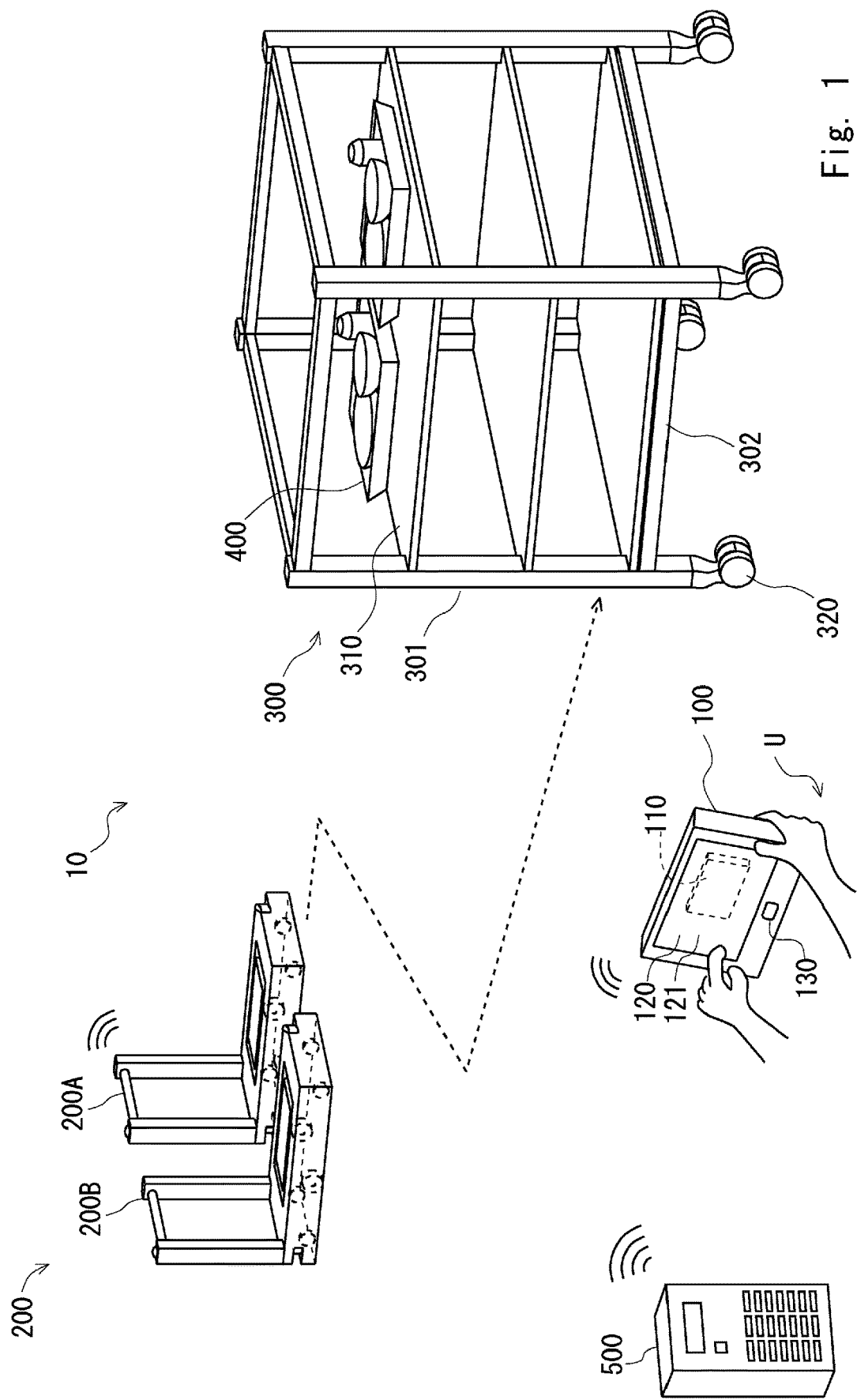
FIG. 1 is an overview diagram of a conveyance system according to a first embodiment.

Referring to FIG. 1, a conveyance system according to a first embodiment will be described. In the conveyance system, a conveyance robot that autonomously moves in a predetermined area conveys a wagon that accommodates conveyed objects. FIG. 1 is an overview diagram of the conveyance system according to the first embodiment. A conveyance system 10 shown in FIG. 1 is one embodiment of the conveyance system. The conveyance system 10 is able to convey, for example, meal for patients from a kitchen, dishes after patients have finished eating to the kitchen, or clothes, bed linen or the like to a predetermined place in a facility such as a hospital. The conveyance system 10 includes, as its main components, an operation apparatus 100, a conveyance robot 200, a wagon 300, and a server 500.

Figure 2:
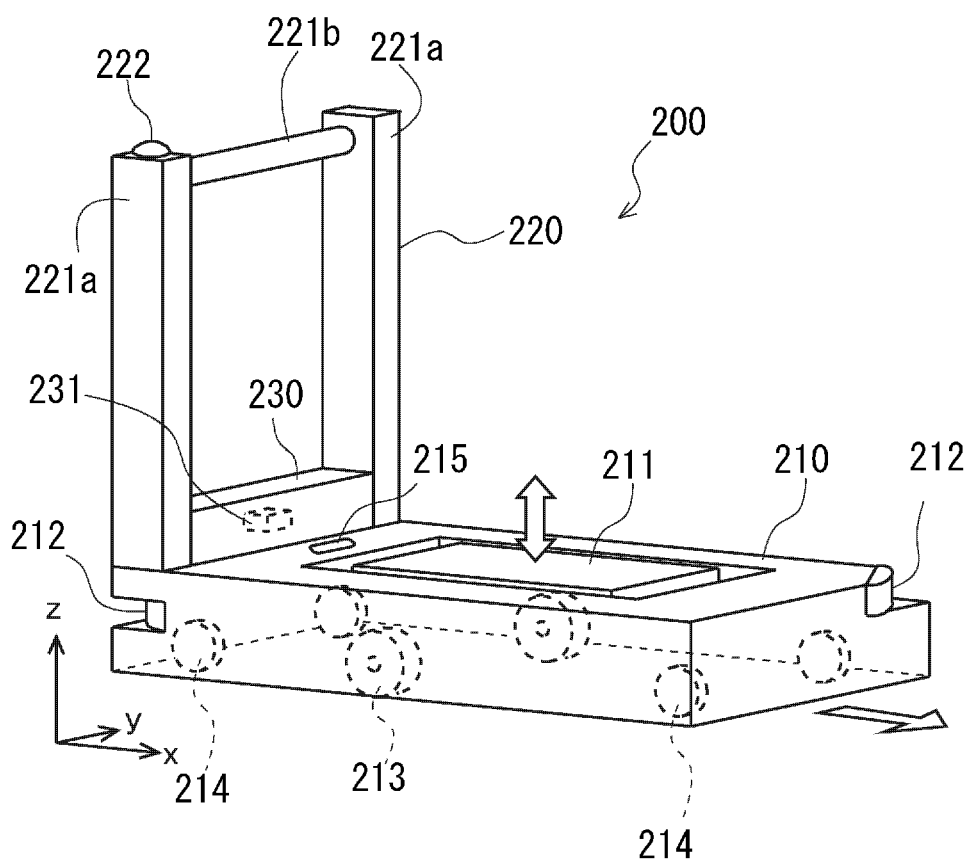
FIG. 2 is an overview diagram of a conveyance robot.

Note that in FIG. 1, a right-handed orthogonal coordinate system is shown for the sake of convenience for explaining a positional relation among components. Further, when an orthogonal coordinate system is shown in FIG. 2 and the following drawings, its X-, Y- and Z-axis directions coincide with the X-, Y- and Z-axis directions of the orthogonal coordinate system.

The operation apparatus 100, which is an apparatus that is connected to the server 500 in such a way that they can communicate with each other wirelessly, is an apparatus for sending an instruction regarding various tasks to a plurality of conveyance robots 200 via the server 500. The operation apparatus 100, which is, for example, a tablet terminal, includes an operation processing unit 110 and the like for controlling the entire conveyance system therein. The operation apparatus 100 further includes a display unit 121 for presenting various kinds of information to a user U and an operation accepting unit 120 which is a touch panel disposed over the display unit 121 and is an interface for allowing the user U to perform an operation.

An ID sensor 130 is provided in the vicinity of the display unit 121. The ID sensor 130, which is a sensor for identifying Identification (ID) of the user U who operates the conveyance robot 200, detects, for example, a unique identifier included in an ID card owned by each user U. The ID sensor 130 includes, for example, an antenna for reading information on a radio tag. The user U brings the ID card close to the ID sensor 130, thereby causing the conveyance robot 200 to recognize the ID of the user, who is an operator.

The conveyance robot 200 is an autonomous mobile robot that moves on the floor surface of the hospital. The conveyance robot 200 conveys the conveyed object accommodated in the wagon 300 from a predetermined position (starting point) to another position (destination). In the following description, an operation in which the conveyance robot 200 moves from a predetermined place to the starting point, obtains the conveyed object, and conveys the conveyed object to the destination may be referred to as "recovering a conveyed object".

The conveyance system 10 according to this embodiment includes two conveyance robots 200. The two conveyance robots 200 are a first robot 200A and a second robot 200B.

In the following description, it is assumed that the term "conveyance robot 200" is a collective term for these two conveyance robots.

Referring to FIG. 2, a configuration of the conveyance robot 200 will be described. FIG. 2 is an overview diagram of the conveyance robot 200. The conveyance robot 200 includes, as its main components, a main body block 210, a handle block 220, and a control block 230.

The main body block 210 has a flat rectangular parallelepiped shape whose principal surface contacts the ground. The height of the principal surface of the main body block 210 is set to one that allows the main body block 210 to enter underneath the wagon 300. Thus the main body block 210 enters underneath the wagon 300 and raises the wagon 300 from below. The main body block 210 includes, as its main components, a raising/lowering unit 211, a distance measurement sensor 212, driving wheels 213, trailing wheels 214, and a speaker 215.

The raising/lowering unit 211, which is a flat-shaped component provided at the center of the upper surface of the main body block 210, includes a substantially smooth contact surface on the upper side (z-axis positive side) thereof. The contact surface is provided in such a way that it becomes parallel to the floor surface (xy plane) and is directed upward. A raising/lowering mechanism (not shown) for raising and/or lowering the raising/lowering unit 211 is provided in the lower side of the raising/lowering unit 211. With the raising/lowering mechanism, the raising/lowering unit 211 is able to raise and lower the contact surface and stop at a predetermined position. Thus the raising/lowering unit 211 is configured to contact the lower part of the wagon 300, raise the wagon 300 in parallel to the floor surface, and hold the wagon 300.

Of the conveyance robots 200, the raising/lowering unit 211 included in the first robot 200A includes, besides the function in which the contact surface moves vertically in parallel to the ground contact surface, a mechanism that is rotated around an axis (y axis) extending in the right-left direction of the conveyance robot 200. Further, the conveyance robot 200 is able to detect the posture of the conveyance robot 200. The first robot 200A uses the aforementioned configuration, thereby maintaining the contact surface to be horizontal when it moves on an upward slope or a downward slope. In this embodiment, this mechanism that the first robot 200A includes is referred to as a posture control mechanism. On the other hand, of the conveyance robots 200, the second robot 200B does not include a mechanism in which the contact surface is rotated (posture control mechanism). Therefore, the contact surface that the second robot 200B includes is always parallel to the ground contact surface. That is, when the second robot 200B is moving on an upward slope or a downward slope, the contact surface is parallel to the slope.

The distance measurement sensor 212 is a sensor that detects the conveyance robot 200 and an object which is in the vicinity of the conveyance robot 200 and is able to measure the distance from the object that has been detected. The distance measurement sensor 212 detects the relative position between the conveyance robot 200 and the object which is in the vicinity of the conveyance robot 200 by, for example, infrared light, laser light, millimeter waves or the like. The distance measurement sensor 212 may be referred to as an object sensor. The distance measurement sensor 212 is provided in each of the front part and the rear part of the main body block 210. Thus the distance measurement sensor 212 is able to detect an obstacle when there is an obstacle in a desired movement direction of the conveyance robot 200.

The conveyance robot 200 sets a safe distance regarding the distance between the obstacle detected by the distance measurement sensor 212 and the conveyance robot 200. The conveyance robot 200 controls the autonomous movement of the conveyance robot 200 in such a way that the distance between the obstacle and the conveyance robot 200 becomes larger than the safe distance. Further, when the distance between the obstacle and the conveyance robot 200 has become smaller than the safe distance, the conveyance robot 200 temporarily stops moving or issues a warning for an obstacle.

The driving wheels 213 contact the floor surface, support the main body block 210, and allow the main body block 210 to move. The main body block 210 includes two driving wheels 213 supported on one rotation axis extending in the right-left direction (y-axis direction) in such a way that they are separated from each other at the center of the conveyance robot 200 in the front-back direction (x-axis direction). The two driving wheels 213 are configured to be able to independently rotate about one rotation axis. The conveyance robot 200 moves forward or backward by driving the right and left driving wheels 213 at the same rotational speed and turns by driving the right and left driving wheels 213 at different rotational speeds or in different rotational directions.

The trailing wheels 214 contact the floor surface, support the main body block 210, and are freely rotated in accordance with the movement of the driving wheels 213. The main body block 210 includes the trailing wheels 214 in the front-back direction of the driving wheels 213. That is, the main body block 210 includes the trailing wheels 214 at four respective corners of the rectangular contact surface.

The speaker 215 is a component for emitting a preset voice. The speaker 215 is provided in such a way that the emitted voice can be recognized by passersby, etc. who are present in the vicinity of the conveyance robot 200. Thus the conveyance robot 200 is able to issue a warning such as calling attention to the presence of the conveyance robot 200 to the passersby, etc. via the speaker 215.

The handle block 220 is used when the user manually tows the conveyance robot 200. The handle block 220 includes two columnar members 221a that stand in parallel to each other with an interval therebetween in the right-left direction on the upper surface of a rear end part of the main body block 210 and a grip part 221b that bridges the upper end parts of the two respective columnar members 221a. A stop button 222 is provided in an upper end part of one of the two columnar members 221a. When the stop button 222 is pressed down, the conveyance robot 200 stops its autonomous movement.

The control block 230 includes a Central Processing Unit (CPU), a circuit and the like for controlling the drive of the conveyance robot 200. The control block 230 is placed in a desired position of the conveyance robot 200 and controls the conveyance robot 200 in accordance with an instruction received from the operation apparatus 100. Further, the control block 230 transmits information acquired from the sensor or the like of the conveyance robot 200 to the operation apparatus 100 as appropriate.

The conveyance robot 200 includes a posture sensor 231. The posture sensor 231, which is a six-axis sensor that is fixed in a desired position of the conveyance robot 200 and detects accelerations in the respective axis directions of the three orthogonal axes and angular velocities around the respective axes, detects a change in the posture of the conveyance robot 200. When, for example, the conveyance robot 200 passes a slope, the posture sensor 231 detects the inclination of the conveyance robot 200 in accordance with the inclination on the floor surface.

Referring is made once again to FIG. 1, and the wagon 300 will be described. The wagon 300 is a conveyed object accommodation body that accommodates a plurality of conveyed objects 400. The wagon 300 forms a frame body having a quadrangular prism shape since a plurality of frames 301 are coupled, and includes casters 320 provided in the four respective corners of the bottom surface part of the wagon 300.

In a place from the bottom surface part to a predetermined height, a bottom plate 302 is provided in parallel to the floor surface. The height from the floor surface to the lower surface of the bottom plate 302 is secured so that the main body block 210 of the conveyance robot 200 can enter the area between the floor surface and the lower surface of the bottom plate 302. The contact surface of the conveyance robot 200 contacts the lower surface of the bottom plate 302.

A plurality of shelf boards 310 are provided in parallel to the floor surface and in such a way that they are separated from one another inside the frame body of the wagon 300. The shelf boards 310 are configured in such a way that the conveyed object 400 is placed on the upper surface of each of the shelf boards 310. The conveyed object 400 is, for example, a tray that enables a patient of the hospital to have a meal, and includes dishes placed on the tray. Further, the dishes may include food left over by the patient.

While the wagon 300 shown in FIG. 1 is configured to accommodate the aforementioned tray, the wagon 300 may have various configurations depending on the conveyed object to be accommodated. For example, the wagon 300 for accommodating the bed linen may have an upper side of the bottom plate 302 formed of a member having a basket shape or a bag shape in place of the shelf board 310. Further, the wagon 300 may have a configuration in which the operation apparatus 100 is fixed thereto. When the wagon 300 and the operation apparatus 100 are integrated with each other, the operation apparatus 100 is set so that it performs an operation on the fixed wagon 300. That is, the user U does not need to perform the operation of selecting the wagon 300. Thus the user is able to easily input information regarding the stability that corresponds to the wagon 300. Further, the wagon 300 may have a configuration in which it does not include the casters 320.

The server 500 is a computer installed in a desired place. The server 500, which is connected to the operation apparatus 100 and two conveyance robots 200 in such a way that they can communicate with each other wirelessly, is a control apparatus that controls the conveyance robot 200.

Figure 3:
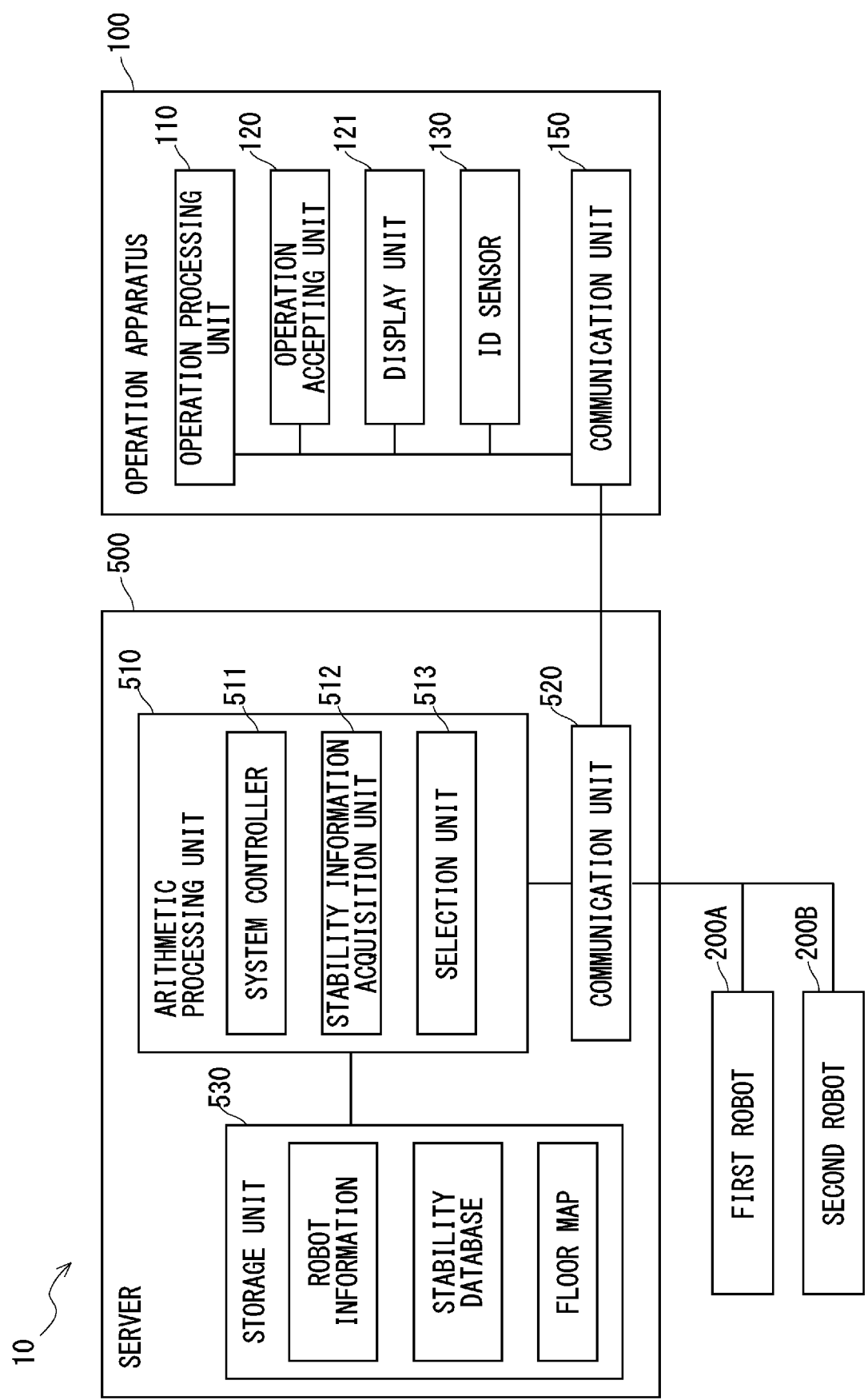
FIG. 3 is block diagram of the conveyance system according to the first embodiment.
Figure 4:
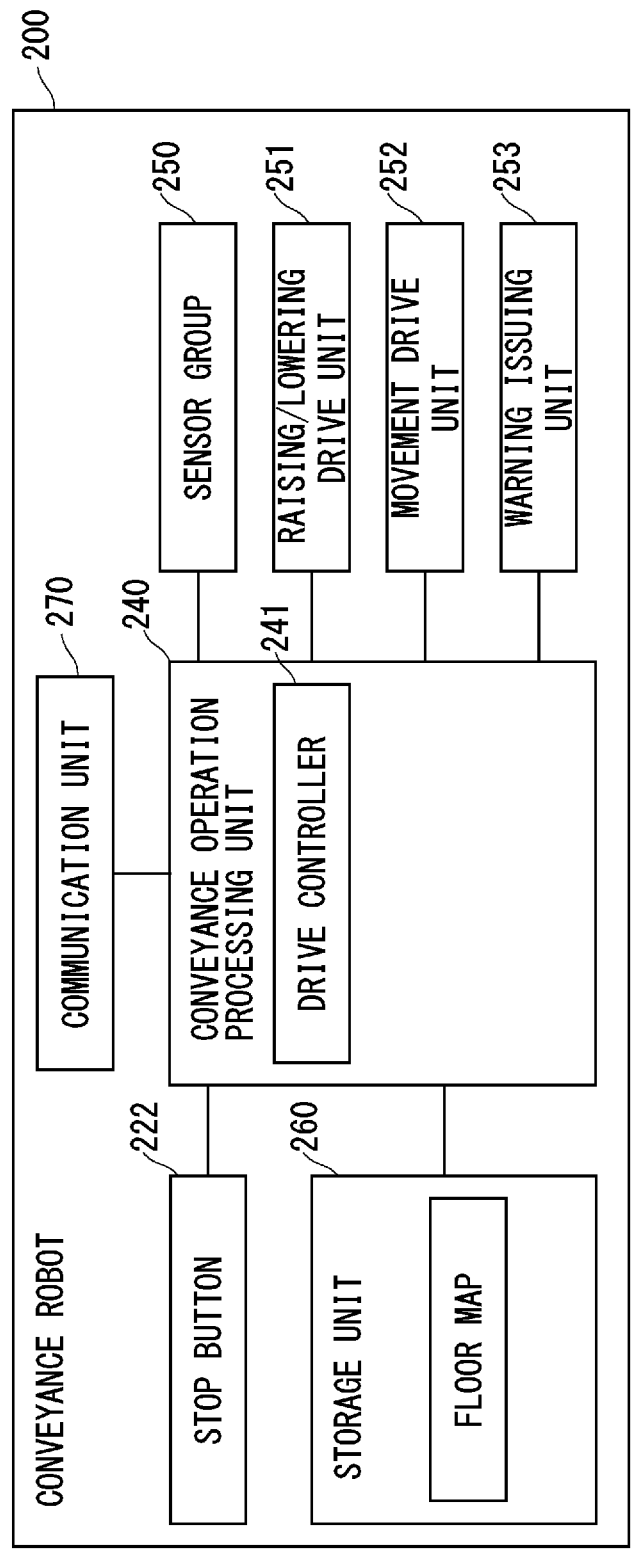
FIG. 4 is a block diagram of the conveyance robot.

Referring next to FIGS. 3 and 4, a system configuration of the conveyance system will be described. FIG. 3 is a block diagram of the conveyance system 10 according to the first embodiment. In the conveyance system 10, the operation apparatus 100, the two conveyance robots 200, and the server 500 are connected to one another in such a way that they can communicate with one another.

The operation apparatus 100 includes, as its main components, an operation processing unit 110, an operation accepting unit 120, a display unit 121, an ID sensor 130, and a communication unit 150.

The operation processing unit 110 is an information processing apparatus including an operation unit such as a Central Processing Unit (CPU). The operation processing unit 110 includes hardware included in the operation processing unit 110 and a program stored in the hardware. That is, the processing executed by the operation processing unit 110 is implemented either by hardware or software. The operation processing unit 110 is connected to each of the components of the operation apparatus 100, acquires information from each of the components, processes the acquired information, and sends instructions to each of the components as appropriate.

The operation accepting unit 120 accepts the input operation from the user and transmits an operation signal to the operation processing unit 110. As means for accepting the input operation from the user, the operation accepting unit 120 includes a touch panel disposed over the display unit 121. The operation accepting unit 120 may include, in place of the touch panel or besides the touch panel, operation means such as a button or a lever. The user U turns on/off a power supply and/or performs an operation of inputting various tasks by operating the above-described input operation means.

The display unit 121 is a display unit including, for example, a liquid crystal panel and displays various kinds of information regarding the conveyance system 10. The display unit 121 is provided with a touch panel that accepts an operation from the user U and displays the content in conjunction with the touch panel.

The ID sensor 130 is connected to the operation processing unit 110 and supplies information regarding the detected ID to the operation processing unit 110.

The communication unit 150, which is an interface through which it is connected to the server 500 in such a way that they can communicate with each other, includes, for example, an antenna, a circuit for modulating or demodulating a signal that is transmitted through the antenna and the like. The communication unit 150, which is connected to the operation processing unit 110, supplies a predetermined signal received from the server 500 to the operation processing unit 110 by wireless communication. Further, the communication unit 150 transmits the predetermined signal received from the operation processing unit 110 to the server 500.

The server 500 includes, as its main components, an arithmetic processing unit 510, a communication unit 520, and a storage unit 530. The arithmetic processing unit 510 is an information processing apparatus including an arithmetic unit such as a CPU. The arithmetic processing unit 510 includes hardware included in the operation processing unit 510 and a program stored in the hardware. That is, the processing executed by the operation processing unit 510 is implemented either by hardware or software. The operation processing unit 510 includes a system controller 511, a stability information acquisition unit 512, and a selection unit 513.

The system controller 511 receives various kinds of information from the operation apparatus 100 and the conveyance robot 200 and sends various instructions to each of the components in accordance with the received information. For example, the system controller 511 instructs one conveyance robot 200 selected by the selection unit 513 that will be described later to perform a task of conveying the conveyed object 400.

The stability information acquisition unit 512 acquires stability information that the user inputs via the operation apparatus 100. The "stability information" according to this embodiment is information indicating the stability of the conveyed object 400 in the conveyance state. The stability information is set by the user performing a predetermined input operation. The stability information acquired by the stability information acquisition unit 512 is used for processing performed by the selection unit 513 described later.

The selection unit 513 receives the stability information accepted by the stability information acquisition unit 512 and refers to robot information stored in the storage unit 530 to select one of the conveyance robots 200. The selection unit 513 supplies, when it has selected one of the two conveyance robots 200, information regarding the selected conveyance robot 200 to the system controller 511.

The communication unit 520, which is an interface through which it is connected to the operation apparatus 100 and the two conveyance robots 200 in such a way that they can communicate with each other, is formed of, for example, an antenna, a circuit for modulating or demodulating a signal that is transmitted through the antenna and the like.

The storage unit 530, which includes a nonvolatile memory such as a flash memory or a Solid State Drive (SSD), stores, for example, robot information, a score element database, and a floor map. The storage unit 530 is connected to the arithmetic processing unit 510 and supplies the stored information to the arithmetic processing unit 510 in accordance with a request from the arithmetic processing unit 510.

The robot information includes information regarding features that the respective conveyance robots 200 include. The stability database stores information for associating the stability information acquired by the stability information acquisition unit 512 with the robot information. The details of the robot information and the stability database will be described later.

The floor map is a map of the facility that the conveyance robot 200 uses for its autonomous movement. The floor map includes information on areas that are candidates for a route through which the conveyance robot 200 autonomously moves, information on the place where the wagon 300 is placed and the place to which the wagon 300 is to be delivered and the like.

Referring next to FIG. 4, a system configuration of the conveyance robot 200 will be described. FIG. 4 is a block diagram of the conveyance robot 200. The conveyance robot 200 includes a stop button 222, a conveyance operation processing unit 240, a group of sensors (hereinafter referred to as a sensor group) 250, a raising/lowering drive unit 251, a movement drive unit 252, a warning issuing unit 253, a storage unit 260, and a communication unit 270.

The stop button 222, which is connected to the conveyance operation processing unit 240, supplies a signal when the stop button is pressed to the conveyance operation processing unit 240.

The conveyance operation processing unit 240, which is an information processing apparatus including an arithmetic unit such as a CPU, acquires information from the respective components of the conveyance robot 200 and sends instructions to the respective components. The conveyance operation processing unit 240 includes a drive controller 241. The drive controller 241 controls operations of the raising/lowering drive unit 251, the movement drive unit 252, and the warning issuing unit 253. When the drive controller 241 has received the information regarding the operation parameter from the setting unit 113, the drive controller 241 performs processing of controlling the raising/lowering drive unit 251, the movement drive unit 252, and the warning issuing unit 253 in accordance with the received information.

The sensor group 250, which is a general term for various sensors included in the conveyance robot 200, includes the distance measurement sensor 212 and the posture sensor 231. The sensor group 250 is connected to the conveyance operation processing unit 240 and supplies the detected signal to the conveyance operation processing unit 240. The sensor group 250 may include, for example, besides the distance measurement sensor 212, a position sensor provided in the raising/lowering unit 211, a rotary encoder provided in the driving wheels 213 or the like. Further, the sensor group 250 may include, for example, besides the aforementioned sensors, a posture sensor configured to detect the inclination of the main body block 210.

The raising/lowering drive unit 251 includes a motor driver for driving the raising/lowering unit 211. The raising/lowering drive unit 251 is connected to the conveyance operation processing unit 240 and is driven upon receiving an instruction from the drive controller 241. The instruction from the drive controller 241 includes, for example, a signal for specifying the operation acceleration of the motor.

The movement drive unit 252 includes a motor driver for driving each of the two driving wheels 213. The movement drive unit 252 is connected to the conveyance operation processing unit 240 and is driven upon receiving an instruction from the drive controller 241. The instruction from the drive controller 241 includes, for example, a signal for specifying the operation acceleration of the motor (moving acceleration of the conveyance robot 200).

The warning issuing unit 253, which is a notification apparatus for issuing a warning to passersby, etc. who are present in the vicinity of the conveyance robot 200 via the speaker 215, includes a driver that drives the speaker 215. The warning issuing unit 253 is connected to the conveyance operation processing unit 240 and is driven upon receiving an instruction from the drive controller 241. The instruction from the drive controller 241 includes, for example, a signal for specifying the volume (notification level) when a warning is issued.

The storage unit 260 includes a nonvolatile memory and stores the floor map and the operation parameter. The floor map, which is a database that is necessary for the conveyance robot 200 to autonomously move, includes information that is the same as at least a part of the floor map stored in the storage unit 530 of the server 500. The operation parameter includes information for instructing, when the conveyance robot 200 has received an instruction regarding the operation parameter from the operation apparatus 100, each of the components to perform an operation in accordance with the received instruction.

Referring next to FIGS. 5-8, one example of the operation in which the conveyance robot 200 conveys the wagon 300 will be described. The wagon 300 described here accommodates clearing trays (trays after the meals thereon have been eaten) after inpatients staying in the hospital have had a meal. The conveyance robot 200 executes a task of conveying the wagon 300 which accommodates the clearing trays.

Figure 5:
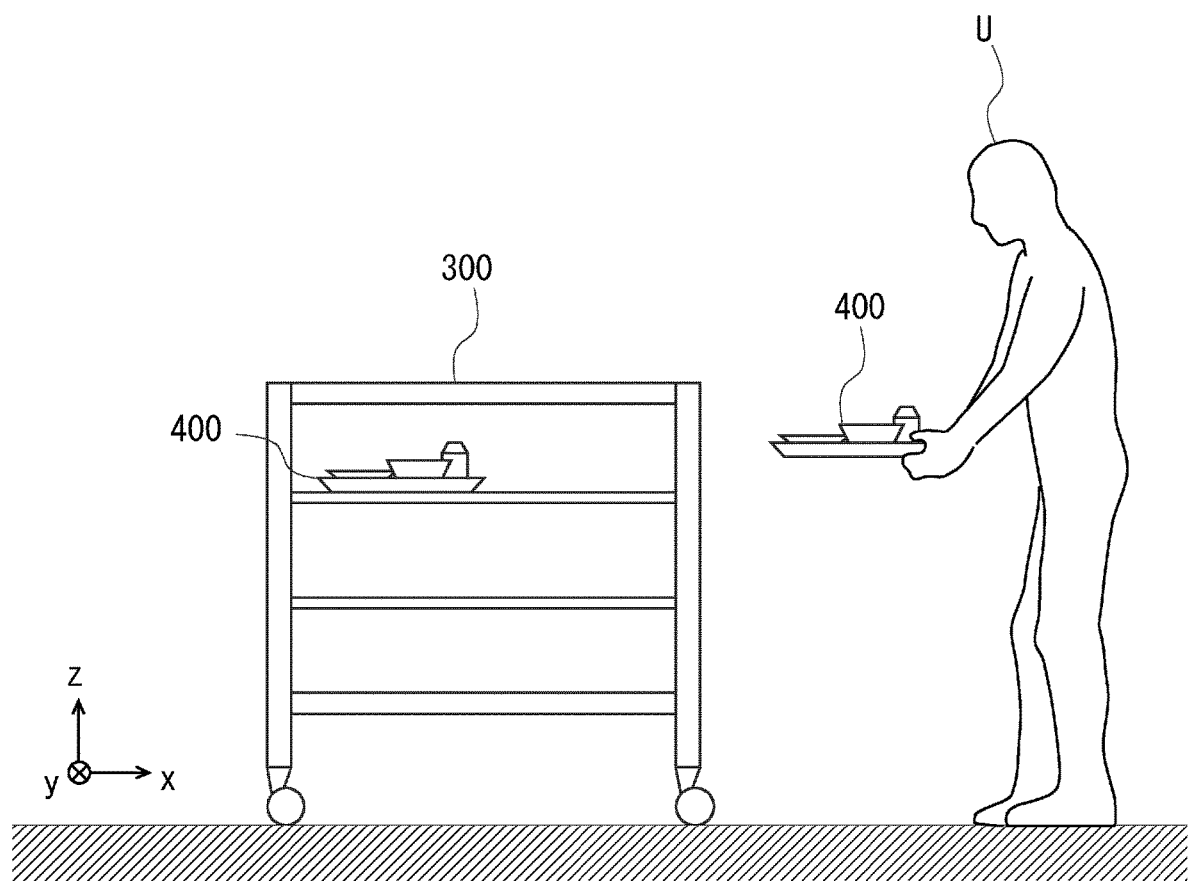
FIG. 5 is a first diagram showing an example in which the conveyance system is used.

FIG. 5 is a first diagram showing an example in which the conveyance system is used. The wagon 300 is placed in the vicinity of a hospital room in the hospital where an inpatient stays. The position where the wagon 300 is placed is predetermined and the conveyance robot 200 is able to move to an area in the vicinity of the wagon 300 by its autonomous movement. For example, an inpatient P stores the clearing tray, which is the conveyed object 400, in the wagon 300. After the clearing tray is accommodated in the wagon 300, the user U who is able to operate the operation apparatus 100 of the conveyance system 10 operates the operation apparatus 100 and inputs a task for conveying the wagon 300. Upon receiving an instruction from the operation apparatus 100, the conveyance robot 200 starts moving from a predetermined place where it has waited to the place where the wagon 300 is present.

Figure 6:
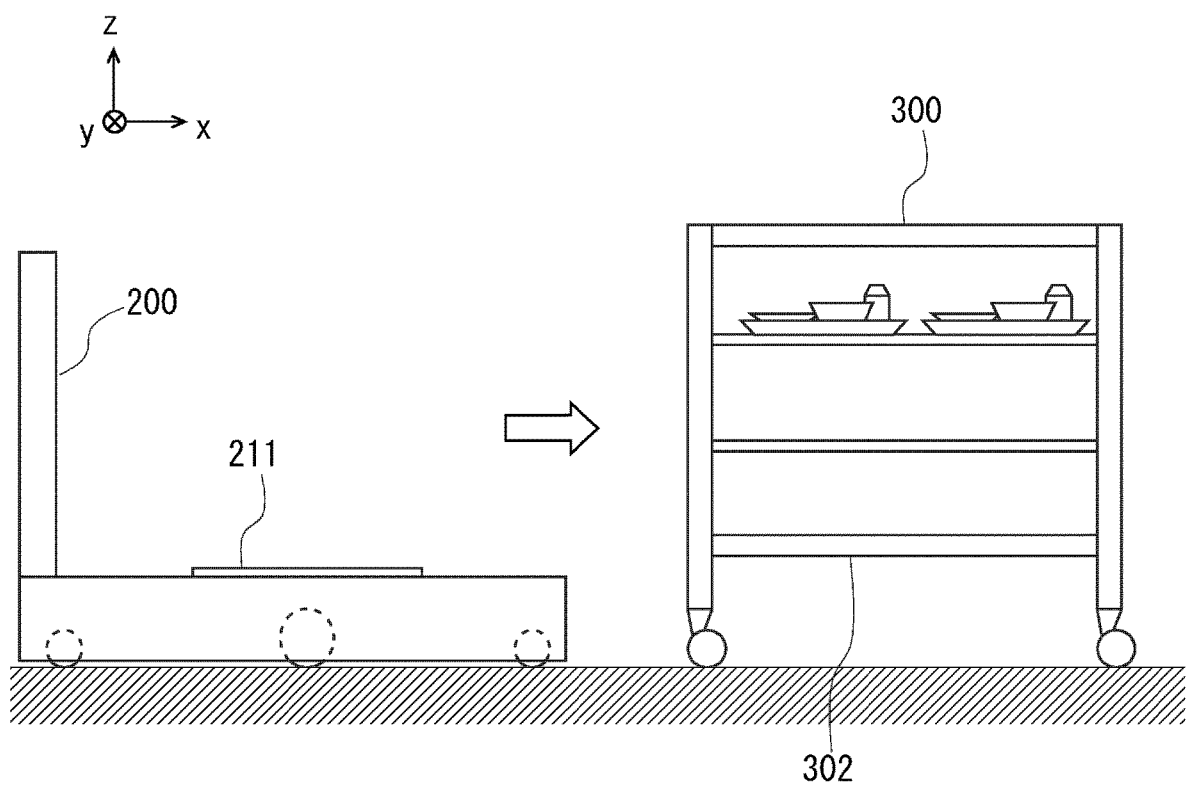
FIG. 6 is a second diagram showing an example in which the conveyance system is used.

FIG. 6 is a second diagram showing an example in which the conveyance system 10 is used. FIG. 6 shows a state in which the conveyance robot 200 that has moved from a predetermined place to the place where the wagon 300 is present is approaching the wagon 300 in order to convey the wagon 300. The conveyance robot 200 enters underneath the wagon 300 from the front part. At this time, the raising/lowering unit 211 is set in a position lower than the bottom plate 302 of the wagon 300.

Figure 7:
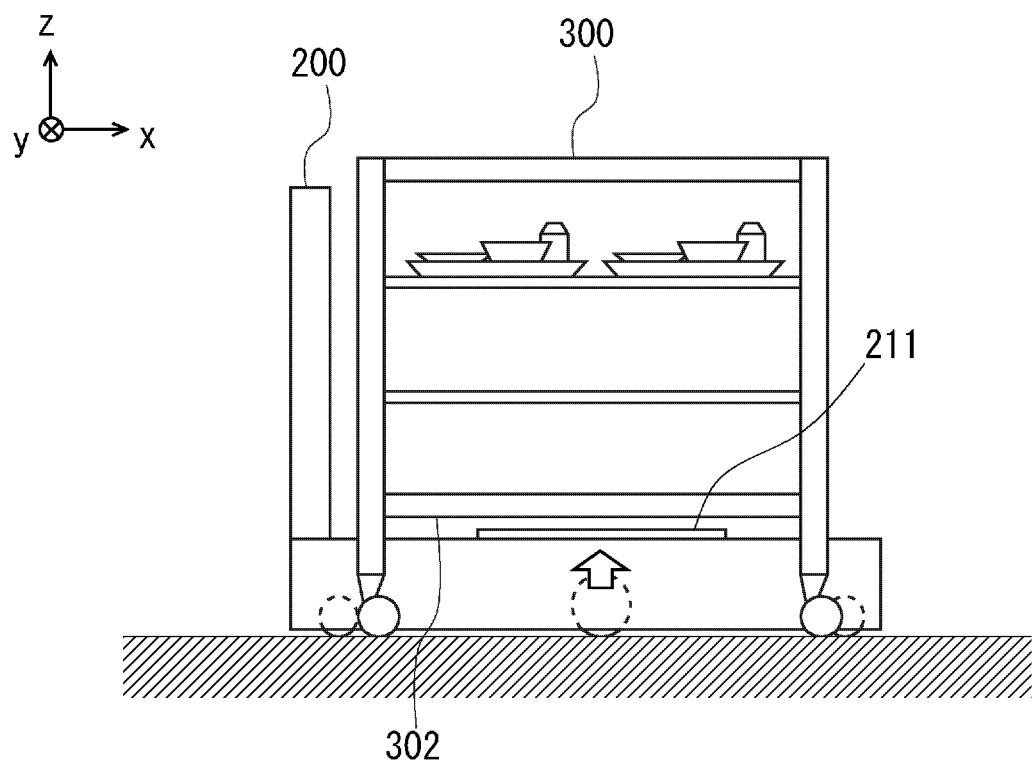
FIG. 7 is a third diagram showing an example in which the conveyance system is used.

FIG. 7 is a third diagram showing an example in which the conveyance system is used. The conveyance robot 200 temporarily stops at a place where the raising/lowering unit 211 is positioned in the vicinity of the center of the wagon 300. Next, the conveyance robot 200 performs an operation of raising the raising/lowering unit 211 to cause the raising/lowering unit 211 to contact the bottom plate 302, thereby raising the wagon 300.

Figure 8:
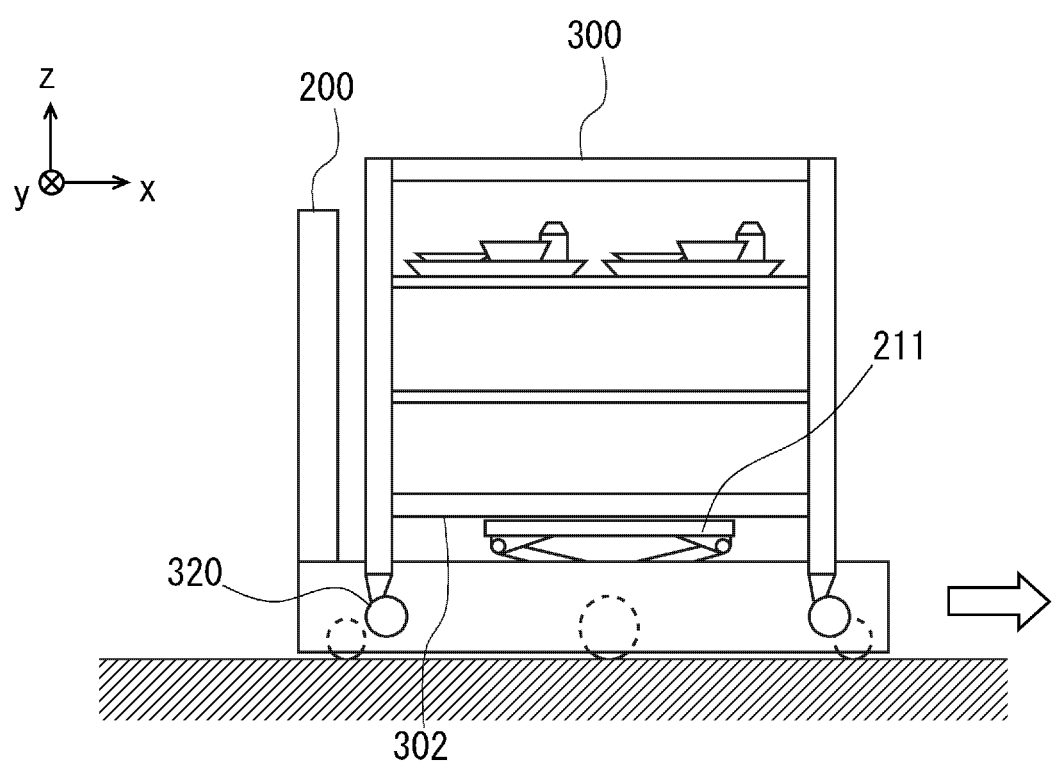
FIG. 8 is a fourth diagram showing an example in which the conveyance system is used.

FIG. 8 is a fourth diagram showing an example in which the conveyance system is used. FIG. 8 shows a state in which the conveyance robot 200 lifts the wagon 300 since the raising/lowering unit 211 is raised. The raising/lowering unit 211 stops at the position shown in FIG. 8. Thus the casters 320 of the wagon 300 are lift up from the floor surface. In this way, the conveyance robot 200 conveys the wagon 300 that accommodates the conveyed objects 400 to the destination while maintaining the state in which the conveyance robot 200 lifts the wagon 300 from the floor surface.

Figure 9:
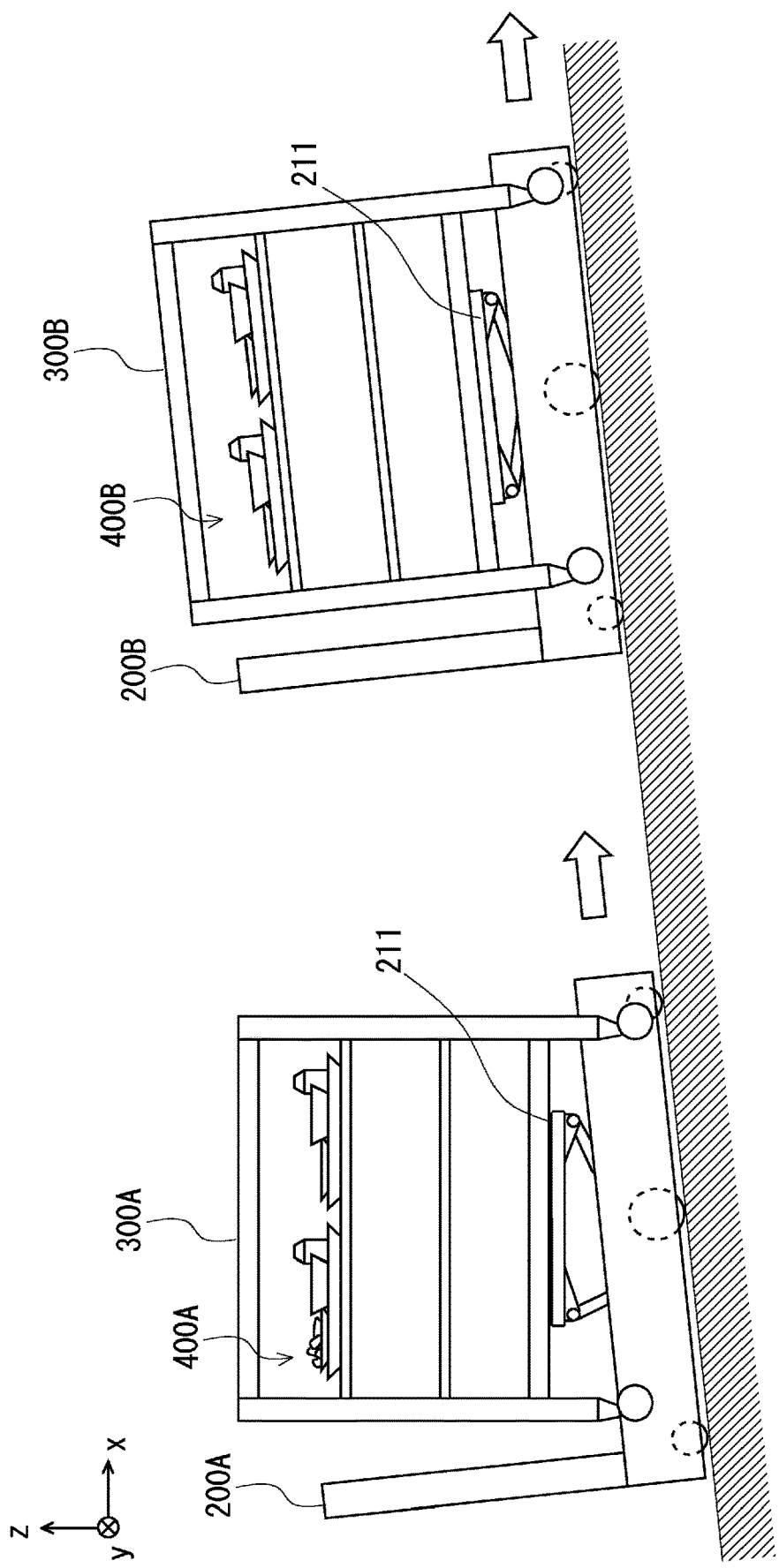
FIG. 9 is a diagram showing an example of the conveyance robot that moves on a slope.

Referring next to FIG. 9, a state in which the conveyance robot 200 moves on a slope will be described. FIG. 9 is a diagram showing an example of the conveyance robot that moves on the slope. FIG. 9 shows a slope that is gradually increased from the left to the right, and the first robot 200A (left side) and the second robot 200B (right side) that move on this slope. Further, as described above, the first robot 200A includes the posture control mechanism that maintains the contact surface of the raising/lowering unit 211 to be horizontal. The second robot 200B does not include the posture control mechanism.

The first robot 200A is conveying a wagon 300A that accommodates a clearing tray 400A. The clearing tray 400A includes a large amount of leftover food. Therefore, if the clearing tray 400A is inclined, it is possible that the leftover food may fall from the clearing tray. That is, the clearing tray 400A is an unstable conveyed object. In this case, the first robot 200A moves on the slope while maintaining the posture of the wagon 300A to be horizontal using the posture control mechanism for maintaining the contact surface of the raising/lowering unit 211 to be horizontal. Therefore, no leftover food falls from the clearing tray 400A.

The second robot 200B is conveying a wagon 300B that accommodates a clearing tray 400B. The clearing tray 400B does not include any leftover food. Therefore, even when the clearing tray 400B is inclined, nothing falls from the clearing tray 400B. That is, the clearing tray 400B is a stable conveyed object. Since the second robot 200B does not include the posture control mechanism, the wagon 300B is tilted along the ground contact surface. However, the second robot 200B is able to convey the wagon 300B without any problem.

The conveyance robot 200 conveys the wagon 300 by the aforementioned operations. As described above, the conveyance system 10 selects one of the plurality of conveyance robots 200 that is appropriate for the conveyance in accordance with the type of the conveyed object, the conveyance state of the conveyed object or the like and causes the selected conveyance robot 200 to convey this conveyed object 400.

Referring next to FIG. 10, the robot information stored in the storage unit 530 will be described. FIG. 10 is a table showing an example of the database regarding the features of the robot. A table T10 shown in FIG. 10 shows, as feature items of each of the two conveyance robots 200, the presence or the absence of the "posture control mechanism". Further, a "score (S)" is shown for each of the conveyance robots 200.

The "score (S)" is a value for associating the stability information with the features of the conveyance robot 200. As the score that corresponds to the conveyance robot 200 is high, this means that the conveyance robot 200 is able to deal with an unstable conveyed object 400. In the table T10, the score that corresponds to the first robot 200A is 3<S. Further, the score that corresponds to the second robot 200B is S≤3. That is, the score that corresponds to the first robot 200A is higher than the score that corresponds to the second robot 200B. This shows that the first robot 200A is more able to deal with an unstable conveyed object 400 than the second robot 200B is. Therefore, the conveyance system 10 selects the first robot 200A when the conveyed object 400 is relatively unstable.

Referring next to FIG. 11, the stability database stored in the storage unit 530 will be described. FIG. 11 is a table showing an example of the database regarding the stability information. The stability database is the one in which the stability information acquired by the stability information acquisition unit 512 corresponds to the score that associates this stability information with the features of the conveyance robot 200.

A table T20 shown in FIG. 11 shows, as the stability information, the "item", the "state of conveyed object", and the "stability". The "item" indicates the kind of the conveyed object. In this example, a "clearing tray" is shown as the conveyed object. Shown as the "state of conveyed object" are "no leftover food", "amount of leftover food: less than half", and "amount of leftover food: half or more". As the "stability", stabilities that correspond to the states of the respective conveyed objects are shown. Further, the right column of the stability information indicates the scores that correspond to the respective stabilities.

According to the table T20, the state of "no leftover food" of the clearing tray is "stable" and the score thereof is "1". Further, the state of "amount of leftover food: less than half" of the clearing tray is "a little unstable" and the score thereof is "3". The state of "amount of leftover food: half or more" of the clearing tray is "unstable" and the score thereof is "5".

The robot information and the stability database stored in the storage unit 530 have been described above. When the conveyance system 10 has accepted the task of conveying the conveyed object from the user U, the selection unit 513 selects one of the first robot 200A and the second robot 200B from the two conveyance robots 200 using the aforementioned robot information and stability database.

Figure 12:
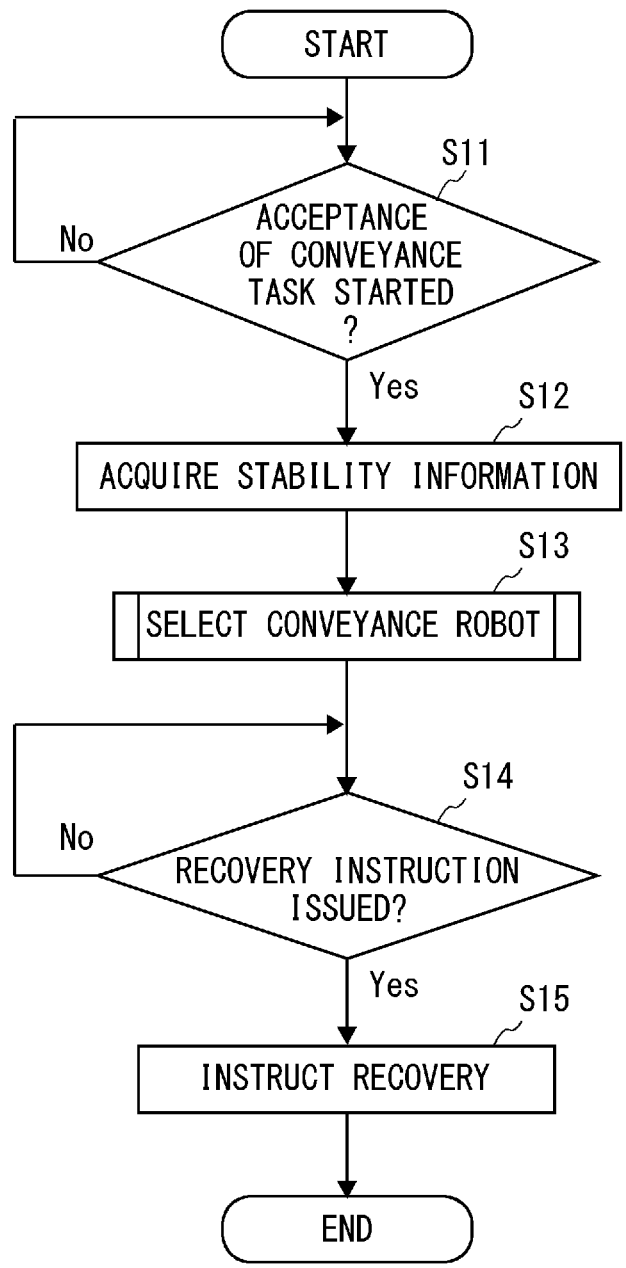
FIG. 12 is a flowchart showing processing of the conveyance system.

Referring to FIG. 12, processing performed by the conveyance system 10 will be described. FIG. 12 is a flowchart showing processing of the conveyance system. The flowchart shown in FIG. 12 shows processing executed by the arithmetic processing unit 510.

First, the arithmetic processing unit 510 determines whether or not the acceptance of the conveyance task has been started (Step S11). When the operation of the conveyance task has not been started (Step S11: No), the arithmetic processing unit 510 repeats Step S11.

When the operation of the conveyance task has been started by the operation of the user U, the arithmetic processing unit 510 determines that the acceptance of the conveyance task has been started (Step S11: Yes). In this case, the arithmetic processing unit 510 proceeds to Step S12. In the processing of accepting the conveyance task, the arithmetic processing unit 510 causes the user U to input information for executing the conveyance task. The information for executing the conveyance task is, for example, the location where the wagon 300 is present, the management number of the wagon 300, the kind or the state of the conveyed object or the like.

Next, the stability information acquisition unit 512 of the arithmetic processing unit 510 acquires the stability information from the operation performed by the user U (Step S12). Next, the selection unit 513 of the arithmetic processing unit 510 selects one of the two conveyance robots 200 (Step S13).

Next, the arithmetic processing unit 510 determines whether or not the instruction for recovering the wagon 300 has been issued (Step S14). When the arithmetic processing unit 510 does not determine that the instruction for recovering the wagon 300 has been received (Step S14: No), the arithmetic processing unit 510 repeats Step S14. On the other hand, when it has been determined that the instruction for recovering the wagon 300 has been received (Step S14: Yes), the arithmetic processing unit 510 proceeds to Step S15.

In Step S15, the arithmetic processing unit 510 sends an instruction for performing an operation for recovering the wagon 300 to the one conveyance robot 200 that has been selected. After Step S16, the arithmetic processing unit 510 ends the series of processing.

The processing executed by the arithmetic processing unit 510 has been described above. According to the above processing, the conveyance system 10 is able to select one preferable conveyance robot 200 based on the stability information input by the user U and cause the selected conveyance robot 200 to approach the wagon 300 to recover it.

Figure 13:
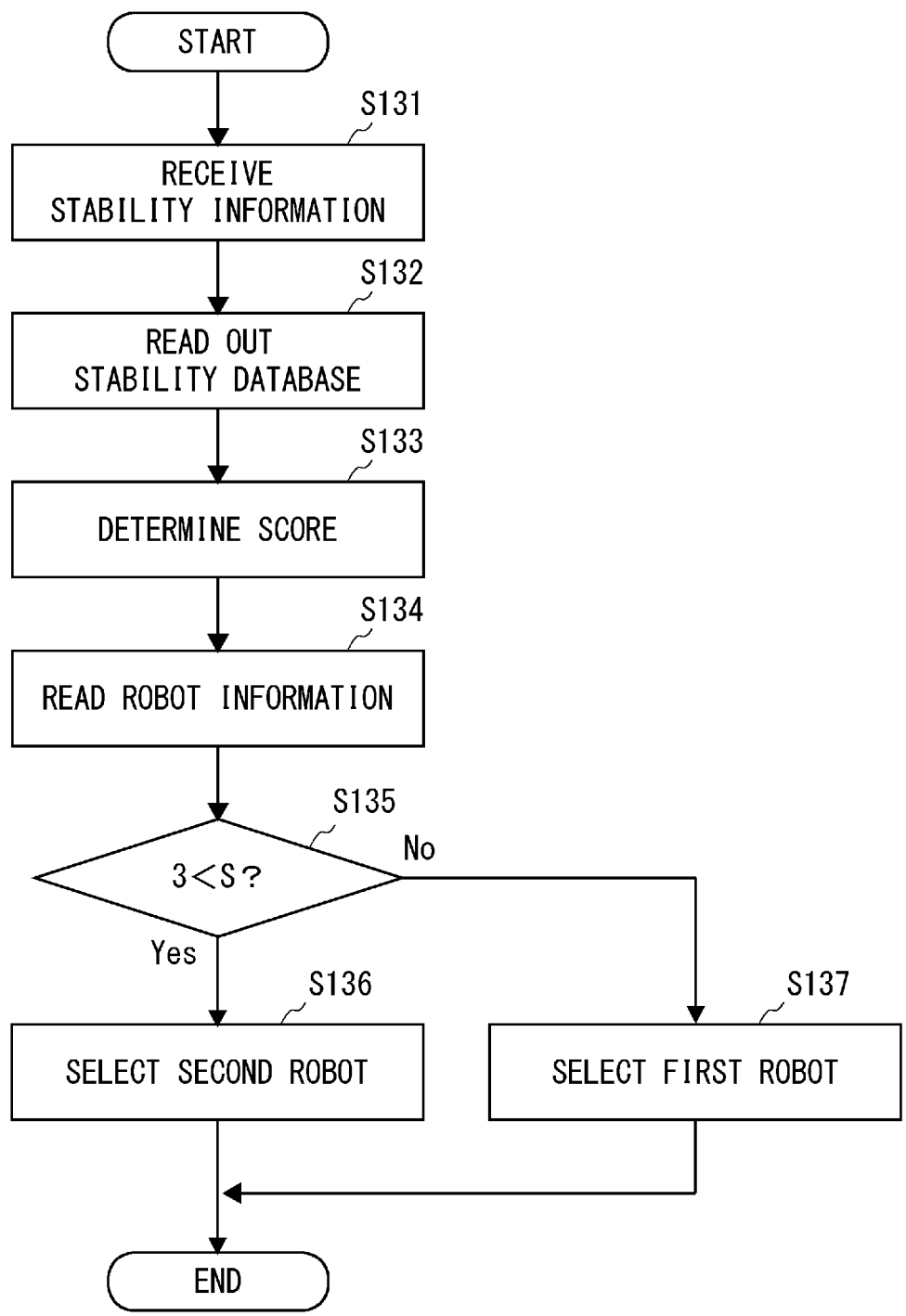
FIG. 13 is a flowchart showing processing of a selection unit.

Referring next to FIG. 13, the details of the processing performed by the selection unit 513 will be described. FIG. 13 is a flowchart showing the processing of the selection unit. The flowchart shown in FIG. 13 shows a specific example of Step S13 of the flowchart shown in FIG. 12.

First, the selection unit 513 receives the stability information acquired by the stability information acquisition unit 512 (Step S131). Next, the selection unit 513 reads out the stability database from the storage unit 530 (Step S132).

Next, the selection unit 513 determines the score related to the task of conveyance from the stability information and the stability database (Step S133). In the case of the example of the table T20 shown in FIG. 11, the score is determined to be one of 1, 3, and 5.

Next, the selection unit 513 reads out the robot information stored in the storage unit 530 (Step S134). The selection unit 513 further determines whether or not the score related to the determination is smaller than 3 from the determined score and the robot information that has been read out (Step S133). The determination made by the selection unit 513 regarding whether or not the score is smaller than 3 is related to the information of the score included in the table T10 shown in FIG. 10.

When the determined score is smaller than 3 (Step S135: Yes), the selection unit 513 selects the second robot 200B (Step S136). On the other hand, when the determined score is not smaller than 3 (Step S135: Yes), the selection unit 513 selects the first robot 200A (Step S137). After selecting the conveyance robot, the selection unit 513 ends the series of processing.

The processing in which the selection unit 513 selects the conveyance robot 200 has been described above. Thus, the selection unit 513 determines the score from the stability information input by the user U and selects the conveyance robot 200 that relates to the score. That is, the selection unit 513 is able to select a conveyance robot that is preferable for the conveyance of the conveyed object 400 from the stability information.

Figure 14:
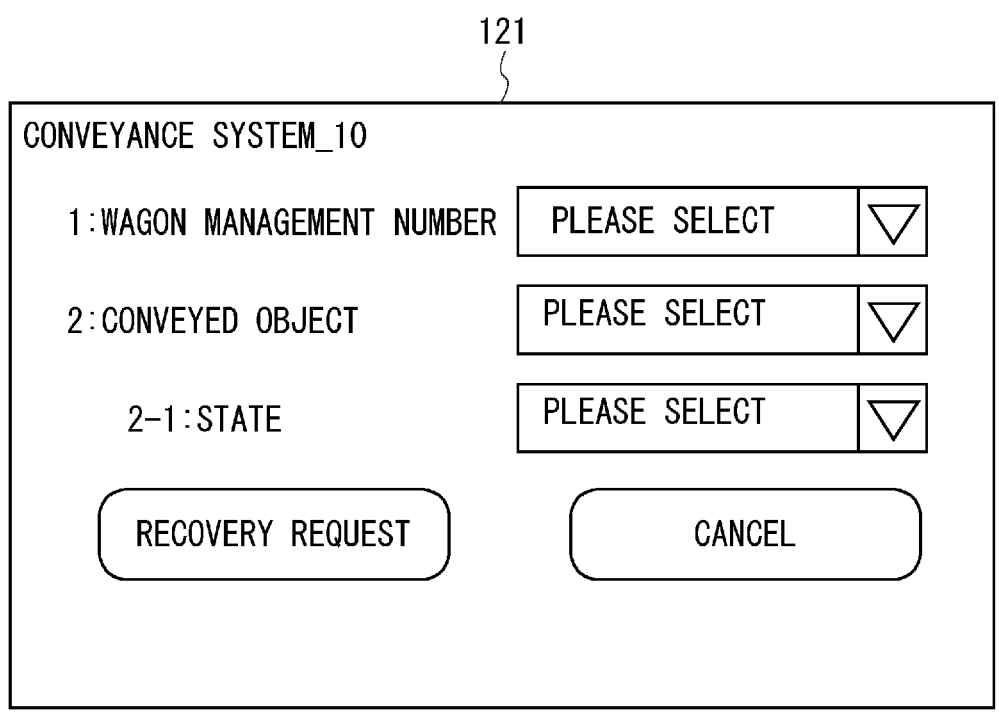
FIG. 14 is a first diagram showing an example of an operation screen of an operation apparatus.

Next, examples of the display unit 121 when the stability information is accepted will be described. FIG. 14 is a first diagram showing an example of the operation screen of the operation apparatus 100. The display unit 121 displays, from the top to the bottom, "1: wagon management number", "2: conveyed object", and "2-1: state", and the right side of each of these items shows a selection frame set so as to be selectable along with the message "please select". The user touches the selection frame, thereby causing selection items to be displayed.

In "1: wagon management number", the user U selects the management number of the wagon 300 that accommodates the clearing tray in the column of the wagon management number. The wagon management number is associated with the place where the wagon 300 is placed. Thus the management number of the wagon 300 is specified, which enables the conveyance robot 200 to specify the place that the conveyance robot 200 goes for the recovery. In "2: conveyed object", the user U selects the conveyed object indicated in the table T10, i.e., "clearing tray" or "bed linen". In "2-1: state", the user U selects, for example, "state of conveyed object" indicated in the table T10.

The lower stage of the display unit 121 shows a button displayed as "recovery request" and a button displayed as "cancel". The user U is able to press the "recovery request" button by selecting all the aforementioned selection items. When the "recovery request" button is pressed, an instruction for conveying the wagon 300 is sent from the operation apparatus 100 to the conveyance robot 200.

Figure 15:
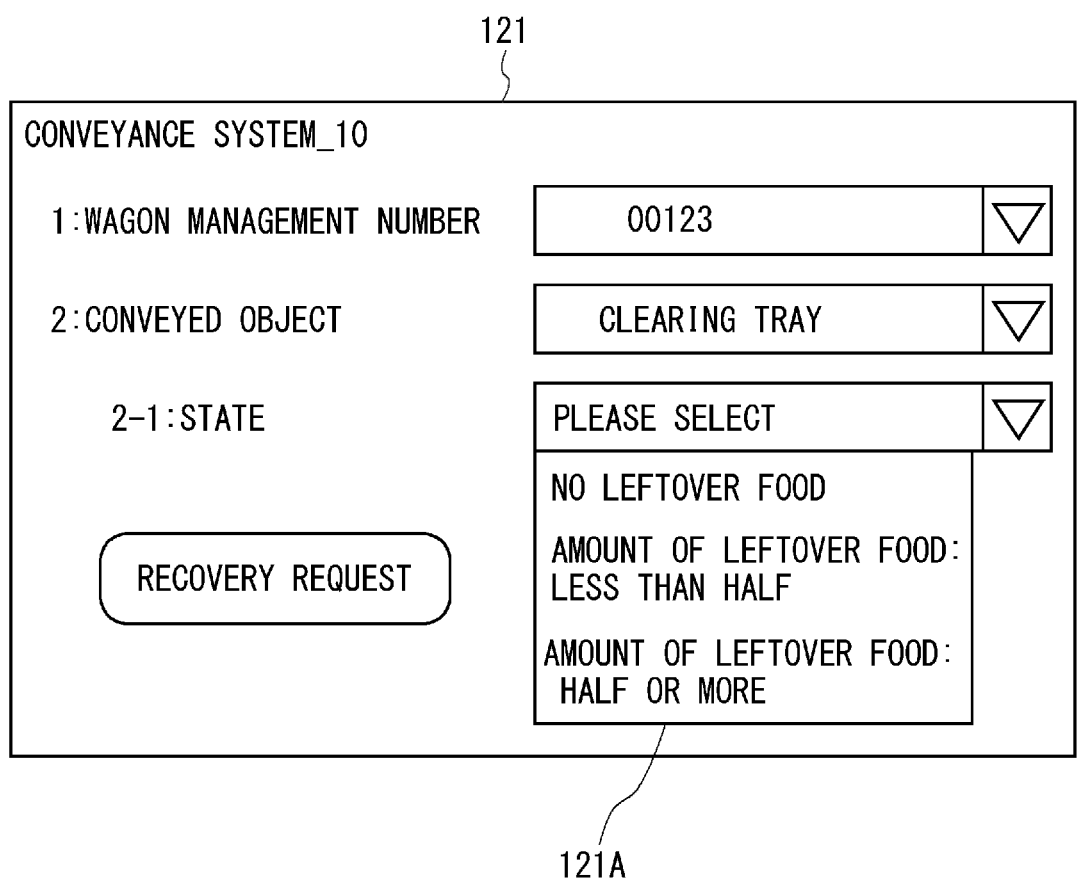
FIG. 15 is a second diagram showing an example of the operation screen of the operation apparatus.

FIG. 15 is a second diagram showing an example of the operation screen of the operation apparatus. The example of the display unit 121 shown in FIG. 15 shows a state in which the user selects the state of the conveyed object. In FIG. 15, a selection column 121A of "2-1: state" shows items indicated as "no leftover food", "amount of leftover food: less than half", and "amount of leftover food: half or more". These items indicate the "state of conveyed object" in the table T10. The user U recognizes the state of the leftover food by visually recognizing the accommodated clearing tray and selects one of the items in the selection column 121A. As described above, the conveyance system 10 causes the user U to select information associated with the stability at the time of conveyance.

The item of the selection column 121A may be, in place of the items of the aforementioned "state of conveyed object", "stable", "a little unstable", and "unstable" shown in "stability" in the table T10. Accordingly, the user U is able to input information regarding whether the conveyed object is stable or unstable when it is conveyed based on the quantitative determination regardless of the amount of leftover food.

Figure 16:
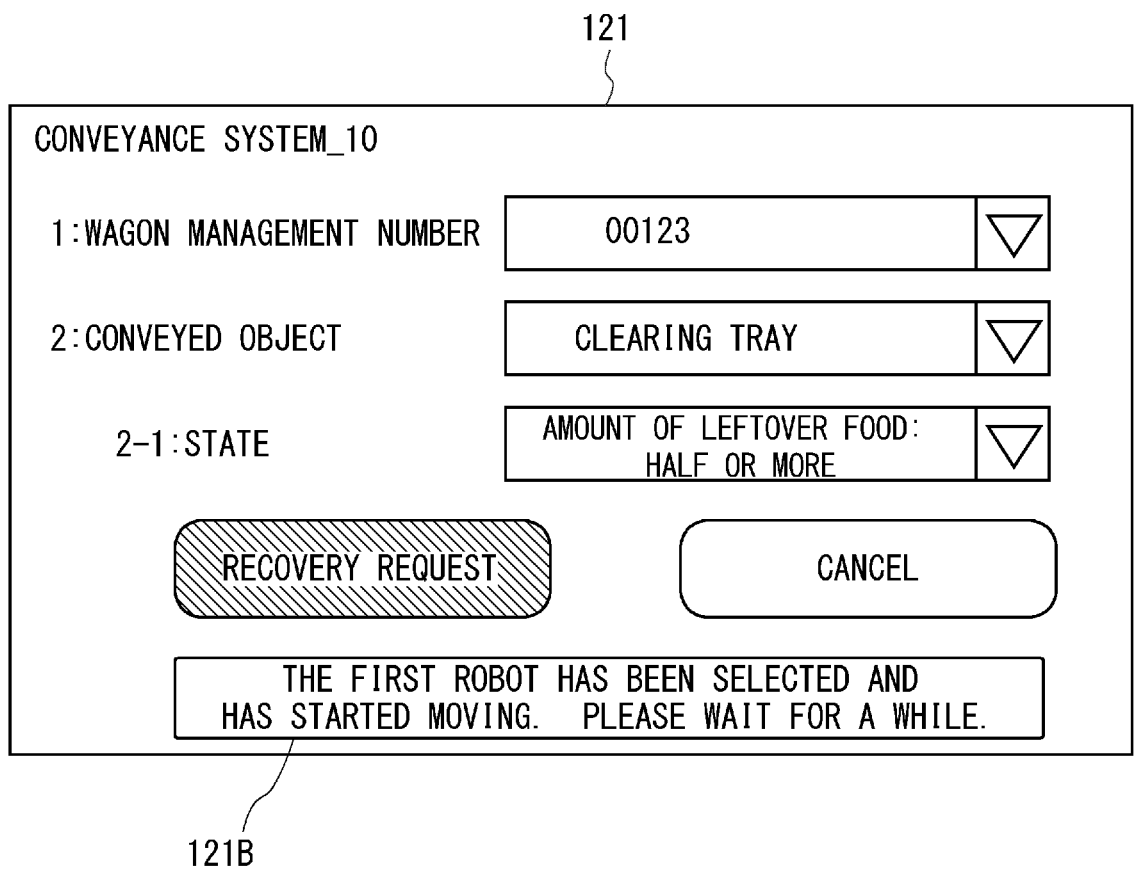
FIG. 16 is a third diagram showing an example of the operation screen of the operation apparatus.

FIG. 16 is a third diagram showing an example of the operation screen of the operation apparatus. The display unit 121 shown in FIG. 16 shows a state in which all the items are selected by the user U and further the "recovery request" button is pressed. In this case, a message column 121B appears in the lower part of the display unit 121. In the message column 121B, a message "The first robot has been selected and has started moving. Please wait for a while." is displayed. This enables the user U to know which conveyance robot 200 has been selected.

Modified Example of First Embodiment

Referring to FIG. 17, a modified example of the first embodiment will be described. FIG. 17 is a table showing an example of the robot information according to the modified example of the first embodiment. The robot information may employ, in place of the presence or the absence of the posture control mechanism as described above, various kinds of information. FIG. 17 is a table showing an example of the robot information according to the modified example of the first embodiment. A table T11 shown in FIG. 17 includes "measurement acceleration" in place of the information regarding the presence or the absence of the posture control mechanism.

The "measurement acceleration" is a stored maximum acceleration detected by the posture sensor 231 of the conveyance robot 200 that moves on the horizontal floor surface. That is, an impact applied to the conveyed object 400 in the conveyance robot 200 whose value of the measurement acceleration is relatively small is smaller than that in the conveyance robot 200 whose value of the measurement acceleration is relatively large. On the other hand, an impact applied to the conveyed object 400 in the conveyance robot 200 whose value of the measurement acceleration is relatively large is larger than that in the conveyance robot 200 whose value of the measurement acceleration is relatively small.

Specifically, the measurement acceleration of the first robot 200A is 0.45. Further, the measurement acceleration of the second robot 200B is 0.31. That is, when the conveyance robot 200 moves on a horizontal floor surface and conveys the conveyed object 400, an impact that the first robot 200A applies to the conveyed object 400 is larger than an impact that the second robot 200B applies thereto.

Referring to the table T20 in FIG. 11, for example, the score when the amount of food left over on the clearing tray is half or more is 5. Further, according to the table T11 shown in FIG. 17, the case in which the score is 5 corresponds to "3<S". In this case, the selection unit 513 selects the second robot. Accordingly, the conveyance system 10 selects the conveyance robot 200 which applies a relatively small impact for the clearing tray on which there are a large amount of leftover food and conveys this tray.

On the other hand, when the amount of food left over on the clearing tray is smaller than half or when there is no leftover food, the score becomes 3 or smaller. Therefore, the selection unit 513 selects the first robot 200A. In this case, the conveyance system 10 may select the second robot 200B. That is, in the table T11, the condition of the score that corresponds to the first robot 200A may be, for example, "1≤S".

Regarding the measurement acceleration, the measurement acceleration measured for each conveyance robot 200 may be input in advance. It is possible, however, that the measurement acceleration may be changed due to degradation over time or the like of the conveyance robot 200. Therefore, the measurement acceleration may be set, for example, in such as a way that it is updated after a preset period (e.g., one week). According to the above configuration, the conveyance system 10 is able to dynamically select a preferable conveyance robot 200.

The variations of the robot information have been described above. The robot information may be a combination of the measurement acceleration shown in FIG. 17 with the information regarding the posture control mechanism shown in FIG. 10.

While the first embodiment has been described above, the form of the conveyance system 10 according to the first embodiment is not limited to the aforementioned one. For example, the number of conveyance robots 200 may three or more.

The conveyance robot included in the conveyance system is not limited to have the aforementioned configuration. For example, the conveyance robot may include a configuration in which it tows the wagon instead of raising the wagon by the raising/lowering unit and conveying the wagon. Further, the conveyance robot may include an accommodation room that accommodates the conveyed object and convey the conveyed object while directly accommodating the conveyed object. In this case, the conveyance robot that includes the accommodation room may have a configuration in which it includes an operation unit with which the operation apparatus is integrated. When this configuration is employed, the user stores the conveyed object in the accommodation room of the conveyance robot and inputs information regarding the stability of the conveyed object that has been accommodated through the operation unit that is integrated with the conveyance robot.

The server 500 may be integrated with the operation apparatus 100. That is, the function of the server 500 may be included in the operation apparatus 100. As described above, the conveyance system selects the conveyance robot in accordance with the stability of the conveyed object. Thus, the conveyance system is able to efficiently convey the conveyance object. Therefore, according to the first embodiment, it is possible to provide a conveyance system and the like capable of preferably conveying the conveyance object.

Second Embodiment

Next, a second embodiment will be described. A conveyance system according to the second embodiment is different from that according to the first embodiment in that the conveyance system according to the second embodiment acquires image data generated by capturing images of a conveyed object and selects a conveyance robot 200 from the image data of the conveyed object that has been acquired.

Figure 18:
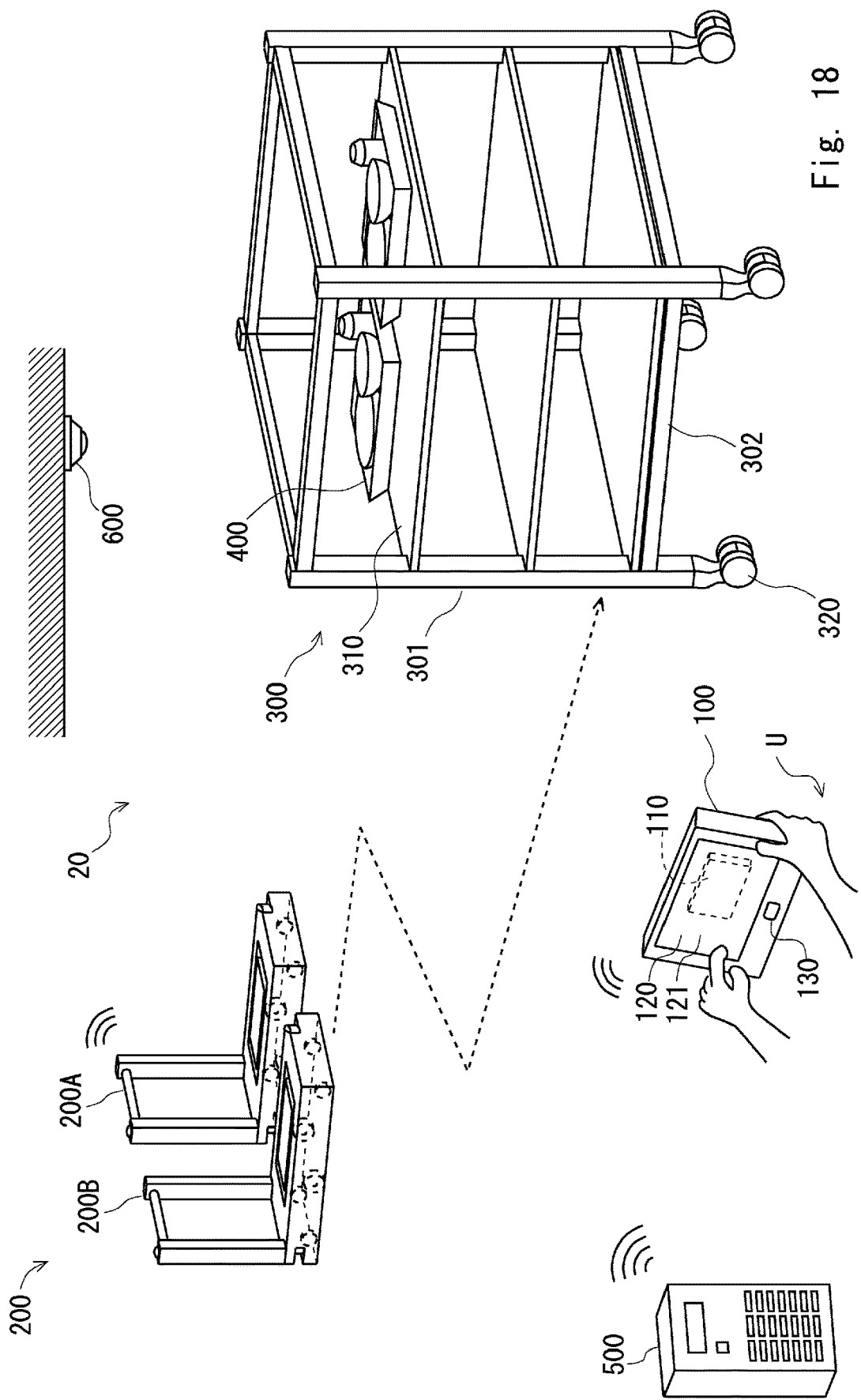
FIG. 18 is an overview diagram of a conveyance system according to a second embodiment.

FIG. 18 is an overview diagram of the conveyance system according to the second embodiment. A conveyance system 20 according to the second embodiment includes a camera 600. The camera 600 is fixed onto the ceiling surface of the place where the wagon 300 is provided in the facility and captures images of the wagon 300 that is present below the camera 600 and at least a part of an area in the vicinity of the wagon 300 from the fixed place. Thus, the camera 600 is configured to be able to capture images of the conveyed object 400 accommodated in the wagon 300.

Figure 19:
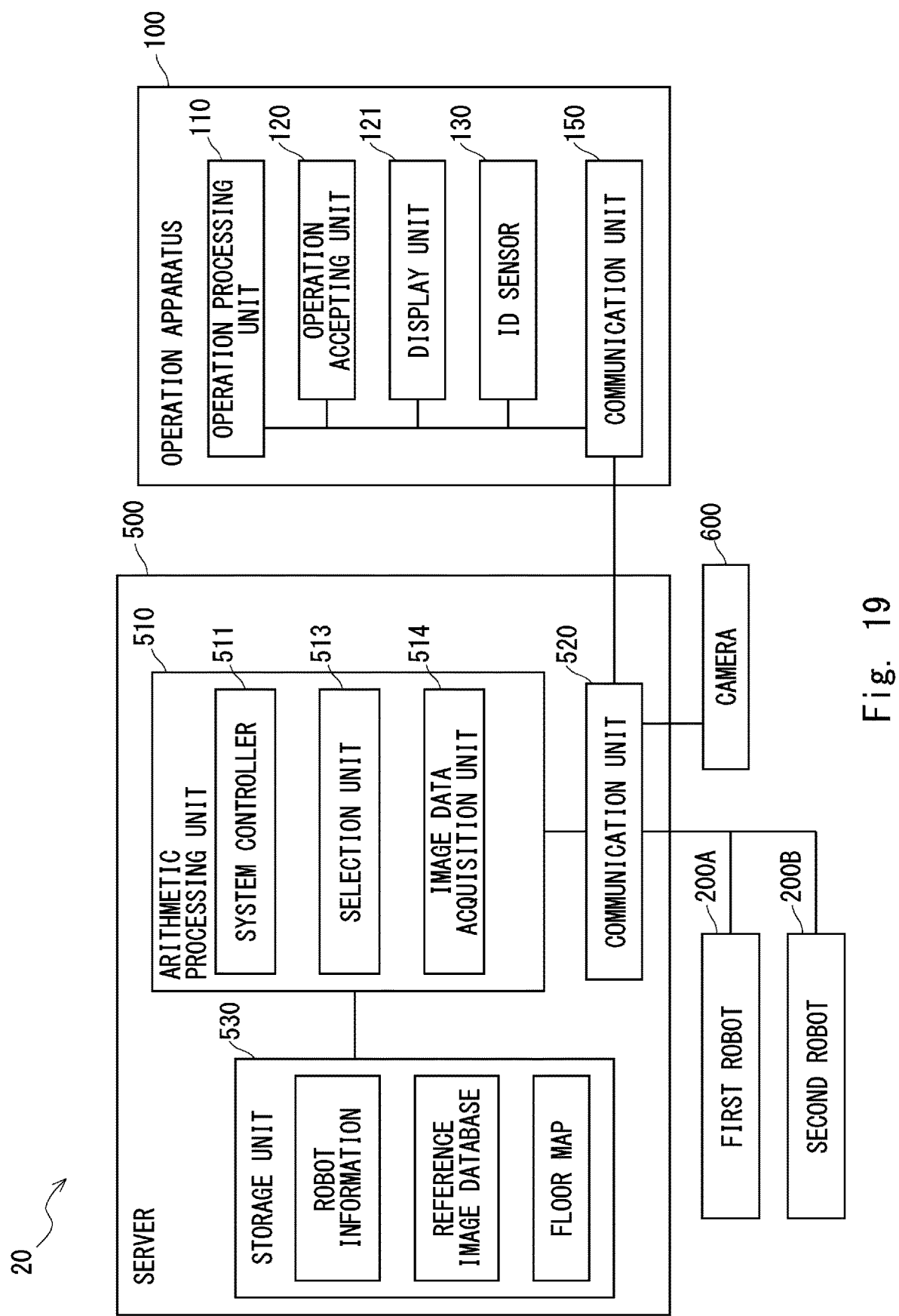
FIG. 19 is a block diagram of the conveyance system according to the second embodiment.

Referring next to FIG. 19, a system configuration of the conveyance system 20 will be described. FIG. 19 is a block diagram of the conveyance system 20 according to the second embodiment. The conveyance system 20 includes an operation apparatus 100, a server 500, a conveyance robot 200, and a camera 600.

An arithmetic processing unit 510 included in the server 500 according to the second embodiment includes, in place of the stability information acquisition unit 512, an image data acquisition unit 514. The image data acquisition unit 514 receives the image data transmitted by the camera 600 and acquires the image data of the conveyed object from the received image data. In order to achieve the aforementioned function, the image data acquisition unit 514 extracts, for example, feature points from the image data received from the camera 600 and determines whether or not the extracted feature points include feature points of a preset conveyed object. As described above, there are various methods for recognizing the object included in the image data and they have already been known to those skilled in the art. Therefore, the detailed description thereof is omitted. The image data acquisition unit 514 supplies the acquired image data to the selection unit 513.

The conveyance system 20 determines the stability using the image data acquired by the image data acquisition unit 514. Therefore, it can be said that the image data acquisition unit 514 is one embodiment of the stability information acquisition unit 512.

A storage unit 530 included in server 500 according to the second embodiment stores a reference image database. The reference image database includes the image data of the conveyed object 400 and information related to the stability that corresponds to this image data.

FIG. 20 is a table showing an example of the database of the reference image data. A table T21 shown in FIG. 20 indicates the reference image data and the score that corresponds to the reference image data. The reference image data is image data generated by capturing images of the clearing tray, which is the conveyed object 400, in advance. The score that corresponds to the reference image data is a score assigned to each reference image data in advance.

For example, the score 1 is given to the reference image data 001. That is, it is considered that the reference image data 001 is the state in which there is no leftover food in the clearing tray. Next, the score 5 is given to the reference image data 002. That is, it is considered that the reference image data 005 is the state in which the amount of leftover food on the clearing tray is half or more. Likewise, the score 3 is given to the reference image data 003. That is, it is considered that the reference image data 003 is the state in which the amount of leftover food on the clearing tray is half or less.

Figure 21:
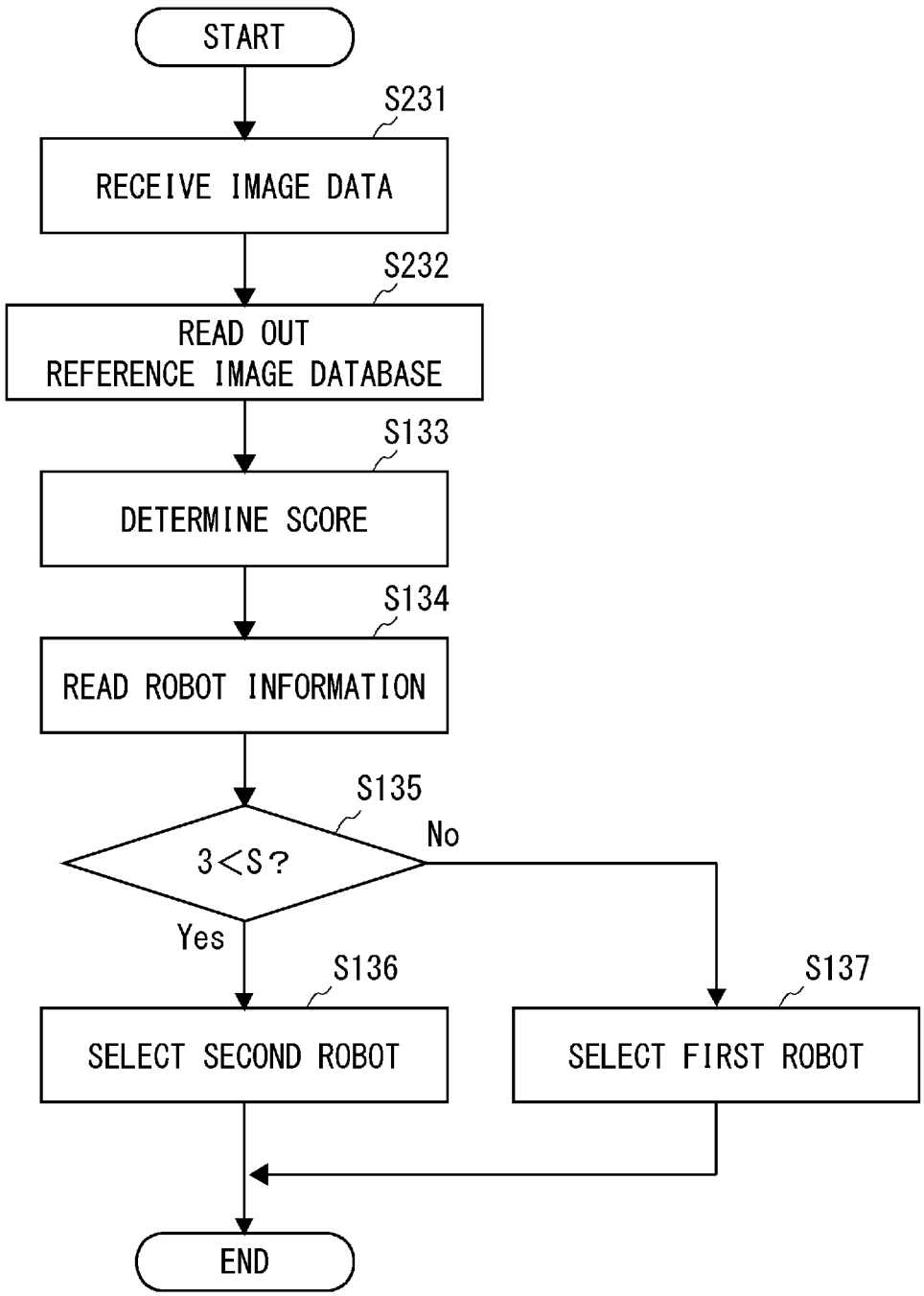
FIG. 21 is a flowchart showing processing of a selection unit according to the second embodiment.

Referring next to FIG. 21, processing performed by a selection unit 513 of the conveyance system 20 will be described. FIG. 21 is a flowchart showing processing of the selection unit 513 according to the second embodiment. The flowchart shown in FIG. 21 includes, in place of Steps S131 and S132 of the flowchart shown in FIG. 13, Steps S231 and S232.

In Step S231, the selection unit 513 receives image data from the image data acquisition unit 514 (Step S231). Next, the selection unit 513 reads out the reference image database stored in the storage unit 530 (Step S232).

The selection unit 513 compares the acquired image data with the reference image data, extracts the reference image data that is close to the acquired image data, and determines the score from the result of the extraction (Step S133). The selection unit 513 executes processing of Step S134 and the following steps using the determined score.

The second embodiment has been described above. The conveyance system 20 according to the second embodiment may further include a function of the stability information acquisition unit 512 according to the first embodiment. The camera 600 may not be provided on the ceiling and may be provided in the wagon 300 or the operation apparatus 100.

As described above, the conveyance system determines the stability from the image data of the conveyed object and selects the conveyance robot in accordance with the stability of the conveyed object. Thus, the conveyance system is able to efficiently convey the conveyance object. Therefore, according to the second embodiment, it is possible to provide the conveyance system and the like capable of preferably conveying the conveyance object.

The aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned embodiments and may be changed as appropriate without departing from the spirit of the present disclosure. For example, while the system in which the conveyance robot autonomously moves in a hospital has been described in the aforementioned embodiments, the aforementioned system is able to convey predetermined objects as conveyed objects in a hotel, a restaurant, an office building, an event venue, or a complex facility.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising:
   a plurality of conveyance robots configured to convey a wagon that accommodates at least one clearing tray after meals thereon have been eaten as a conveyed object; and
   a server configured to
   store robot information regarding features that the plurality of conveyance robots respectively include;
   acquire an amount of leftover food as stability information regarding stability when the conveyed object is conveyed;
   select one of the plurality of conveyance robots based on the robot information and the stability information that have been acquired; and
   instruct the one of the plurality of conveyance robots to convey the conveyed object.

2. The conveyance system according to claim 1, wherein the server is configured to accept an input from a user regarding the stability information, thereby acquiring the stability information.

3. The conveyance system according to claim 1, wherein
the server is configured to store each of reference image data of the conveyed object and information regarding the stability that corresponds to the reference image data in advance,
the server is configured to acquire image data obtained by capturing images of the conveyed object as the stability information, and
the server is configured to compare the image data of the conveyed object with the reference image data to determine the stability of the conveyed object.

4. The conveyance system according to claim 1, wherein
the server stores features of a raising/lowering mechanism for raising and/or lowering the wagon that each of the plurality of conveyance robots includes as the robot information, and
the server is configured to select the one of the plurality of conveyance robots based on the features of the raising/lowering mechanism that each of the plurality of conveyance robots includes.

5. The conveyance system according to claim 1, wherein
the server stores respective information regarding operation accelerations for each of the plurality of conveyance robots as the robot information, and
the server is configured to select the one of the plurality of conveyance robots based on the information regarding the operation accelerations.

6. A conveyance method for selecting one of a plurality of conveyance robots configured to convey a wagon that accommodates at least one clearing tray after meals thereon have been eaten as a conveyed object and causing the one of the plurality of conveyance robots to convey the wagon, the conveyance method comprising:
  storing robot information regarding features that the plurality of conveyance robots respectively include;
  acquiring an amount of leftover food as stability information regarding stability when the conveyed object is conveyed;
  selecting one of the plurality of conveyance robots based on the robot information and the stability information that have been acquired; and
  instructing the one of the plurality of conveyance robots to convey the conveyed object.

7. A non-transitory computer readable medium storing a program for causing a computer to execute a conveyance method for selecting one of a plurality of conveyance robots configured to convey a wagon that accommodates at least one clearing tray after meals thereon have been eaten as a conveyed object and causing the one of the plurality of conveyance robots to convey the wagon, the conveyance method comprising:
  storing robot information regarding features that the plurality of conveyance robots respectively include;
  acquiring an amount of leftover food as stability information regarding stability when the conveyed object is conveyed;
  selecting one of the plurality of conveyance robots based on the robot information and the stability information that have been acquired; and
  instructing the one of the plurality of conveyance robots to convey the conveyed object.

* * * * *